(12) United States Patent
Zelinski

(10) Patent No.: US 6,609,590 B2
(45) Date of Patent: Aug. 26, 2003

(54) EXHAUST SYSTEM HAVING ANGLED BAFFLE

(76) Inventor: Joseph Raymond Zelinski, 841 Broad St., Menasha, WI (US) 54952

( * ) Notice: Subject to any disclaimer, the term of this patent is extended or adjusted under 35 U.S.C. 154(b) by 0 days.

(21) Appl. No.: 09/952,336

(22) Filed: Sep. 12, 2001

(65) Prior Publication Data

US 2002/0104708 A1 Aug. 8, 2002

Related U.S. Application Data

(60) Provisional application No. 60/231,826, filed on Sep. 11, 2000.

(51) Int. Cl.$^7$ ................................................ F01N 1/00
(52) U.S. Cl. ................. 181/281; 181/264; 181/270; 181/277; 181/278
(58) Field of Search ................ 181/281, 264, 181/270, 277, 278, 212, 267, 266

(56) References Cited

U.S. PATENT DOCUMENTS

| | | | |
|---|---|---|---|
| 1,688,488 A | 10/1928 | Dormeyer | |
| 1,927,947 A | * 9/1933 | Newell | 181/278 |
| 3,292,731 A | 12/1966 | Ballard | 181/36 |
| 3,726,359 A | 4/1973 | Dierl et al. | 181/42 |
| 3,754,619 A | 8/1973 | McCormick | 181/50 |
| 4,031,979 A | 6/1977 | Raleigh | 181/69 |
| 4,474,260 A | * 10/1984 | Valentine | 181/230 |
| 4,530,418 A | 7/1985 | Currie | 181/227 |
| 4,609,068 A | 9/1986 | Backlund | 181/226 |
| 4,787,869 A | 11/1988 | Shiozawa | 440/89 |
| 5,094,640 A | 3/1992 | Burdick et al. | 440/89 |
| 5,162,620 A | * 11/1992 | Ross et al. | 181/220 |
| 5,198,625 A | 3/1993 | Borla | 181/248 |
| 5,326,942 A | 7/1994 | Schmid | 181/235 |
| 5,378,435 A | * 1/1995 | Gavoni | 422/177 |
| 5,696,361 A | 12/1997 | Chen | 181/224 |

FOREIGN PATENT DOCUMENTS

| | | | |
|---|---|---|---|
| FR | 1044850 | 11/1953 | ............ 5/8 |
| FR | 2527684 | 2/1983 | ......... F01N/3/08 |
| GB | 416247 | 9/1934 | |
| JP | 52133434 | 8/1977 | ......... F01N/1/06 |
| JP | 61205312 | 11/1986 | ......... F01N/1/24 |

* cited by examiner

*Primary Examiner*—Shih-Yung Hsieh
(74) *Attorney, Agent, or Firm*—Wilhelm Law Service; Thomas D. Wilhelm

(57) ABSTRACT

In-line exhaust systems comprise an exhaust pipe, and a sound-attenuating baffle in the exhaust pipe. The baffle has one or more baffle plates extending across the gas flow channel, at least one at an oblique angle. Each plate has an array of apertures therethrough. The plates are joined to each other, preferably in edge-to-edge relationship, preferably forming included angles with each other and forming preferably different, oblique angles to the longitudinal axis. In preferred embodiments, plate aperture area increases, plate-to-plate, along the direction of advance of gases in the exhaust system. A backwash valve can lie over one of the baffle plates. The exhaust system can include a water jacket, and optionally an outer sound attenuation chamber. The baffle is preferably 36 or less inches long, the exhaust system reducing noise by at least 3 decibels.

37 Claims, 10 Drawing Sheets

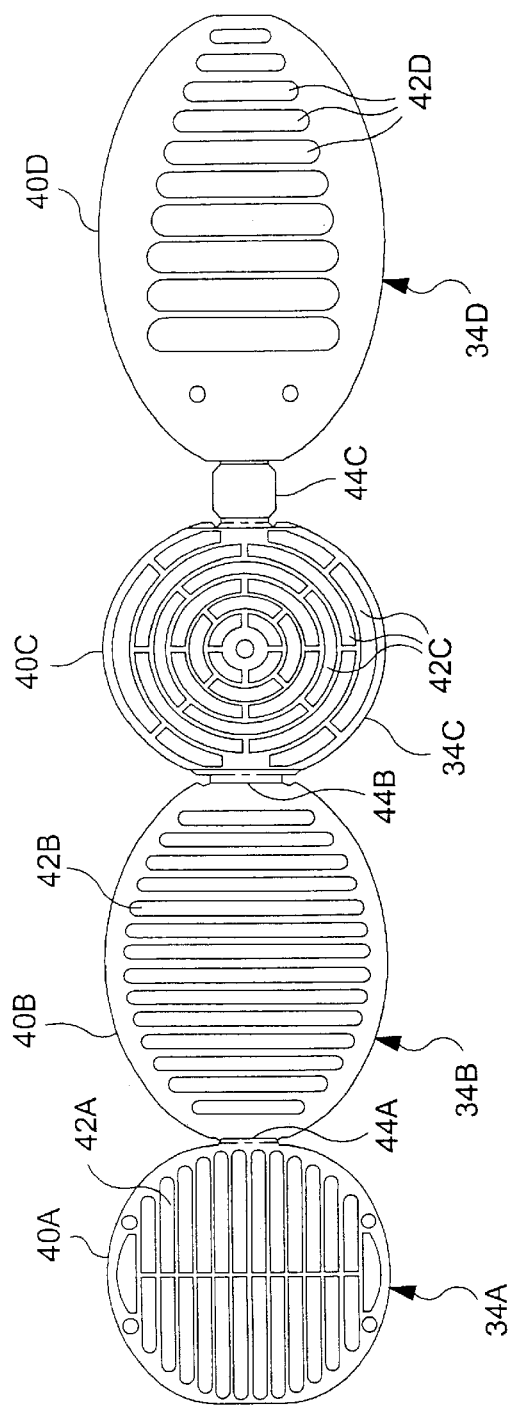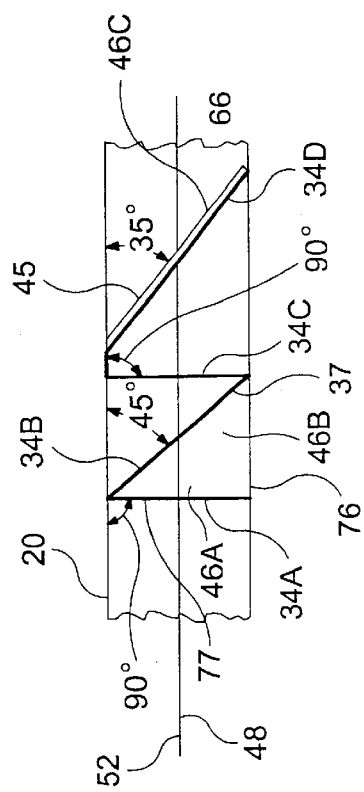

EXHAUST SYSTEM HAVING ANGLED BAFFLE

CROSS-REFERENCE TO RELATED APPLICATIONS

This application claims priority from Provisional Application Ser. No. 60/231,826 filed Sep. 11, 2000.

BACKGROUND

This invention relates generally to exhaust systems, and specifically to exhaust systems for marine and other limited-space environments, for controlling and disposing of engine exhaust gases while attenuating the engine noise associated with exhaust gases expelled from the engine.

Historically, society has gradually increased restrictions on the amount of noise which is tolerated from vehicles driven by internal combustion engines. Restrictions have been placed on automobile noise emissions. Restrictions have also been placed on aircraft noise emissions. More recently, restrictions have been imposed in some localities on boat noise emissions.

The difficulty with sound attenuation in the context of boats is that there is typically more limited room in a boat or boat engine compartment, thus precluding use of an expansive e.g. automobile-style muffler where the exhaust gases typically make two or more 180 degree turns inside the muffler. Existing designs of water craft typically do not provide adequate space, given the engine design contemplated for the water craft, to accommodate an automotive-style muffler of sufficient size to suitably control sound emissions from the engine.

A further complication is that consumers prefer increasingly larger size engines in marine vehicles, which emit greater volumes of exhaust gases, and are accompanied with greater levels of the sound which must be attenuated as the gases travel between the engine exhaust ports and the exhaust tip of the exhaust system.

Conventional high performance marine exhaust systems have routinely run the exhaust gases out the rear of the boat, with the only sound attenuation being whatever attenuation is incidentally developed by a spray of water injected into the exhaust pipe just behind the exhaust header.

Thus, there is a requirement for a sound-attenuating exhaust system, especially an exhaust system effective in marine applications, which is compact in size, effective in attenuating sound, and cost effective.

This invention relates generally to an in-line exhaust system which operates in an exhaust pipe generally sized to handle the exhaust gases, with conventional sound-attenuation treatment in a conventional sound attenuation cannister, from a respective size engine, whereby desired levels of sound attenuation can be accomplished while operating within, or substantially close to, the external dimensions of an exhaust pipe suitable for use with such engine while using conventional sound attenuation devices. Thus, the invention achieves sound attenuation while adding little or no space requirements in additional to the conduit requirements for conveying the exhaust gases to the rear of the boat for expulsion to ambient.

It is an object of the invention to provide a suitable sound attenuating exhaust system which utilizes an in-line sound attenuation design which continually passes the exhaust gases toward an exit tip of the exhaust pipe.

Another object is to provide an in-line sound-attenuating exhaust system wherein at least a first apertured baffle plate, having substantial gas-deflecting surface area, extends across the gas flow channel of an exhaust pipe at an oblique angle to the longitudinal axis of the exhaust pipe.

It is a further objective to provide a sound-attenuating exhaust system, and a baffle for use in such sound-attenuating exhaust system, wherein the baffle has multiple baffle plates, first and second such baffle plates having aperture configurations different and distinct from each other.

It is another objective to provide an exhaust system, and a baffle, including first, second, and third baffle plates, and wherein at least one such baffle plate defines a plate angle, relative to a longitudinal axis of such baffle, different from another such plate angle.

Yet another objective is to provide an exhaust system comprising an internally-carried baffle having a length of no more than 36 inches, wherein the exhaust system is effective to reduce sonic intensity by at least 3 decibels.

It is still another objective to provide an exhaust system, including an exhaust pipe and a baffle inside the exhaust pipe, wherein the baffle and exhaust pipe define a friction fit therebetween, and wherein force exerted on the exhaust receiving surface of the first, input baffle plate increases the intensity of the friction fit.

Still another objective is to provide an in-line sound-attenuating exhaust system wherein baffle plates, in combination with the internal surface of the exhaust pipe, define sound attenuation chambers having longitudinal cross-sections, and wherein no cross-section configuration represents more than 50 percent of the cross-sections in the baffle.

It is still another object of the invention to provide an in-line exhaust system wherein each baffle plate defines a different angle or angle pattern with a longitudinal axis of the baffle.

Still another object is to provide an in-line sound-attenuating exhaust system wherein first and second elliptical, apertured baffle plates are joined to each other and cross each other in a gas flow channel of an exhaust pipe.

Yet another object is to provide an in-line sound-attenuating exhaust system wherein at least first and second substantially planar baffle plates extend across substantially the full cross-section of the gas flow channel of the exhaust pipe, at oblique angles, spaced from each other and parallel to each other.

SUMMARY

In a first family of embodiments, this invention comprehends in-line sound attenuating exhaust systems for use in combination with internal combustion engines. Such exhaust system comprises an exhaust pipe having first and second ends, and a length between the first and second ends, an inner surface, an outer surface, a gas flow channel, and a longitudinal axis. Such exhaust system further comprises a sound-attenuating baffle disposed in the exhaust pipe. The baffle comprises at least a first baffle plate extending across the gas flow channel at an oblique angle to the longitudinal axis of the exhaust pipe. The baffle plate has an exhaust receiving surface defining substantial gas-deflecting surface area, an exhaust discharging surface, and an array of apertures extending between the exhaust receiving surface and the exhaust discharging surface.

The baffle preferably includes a second baffle plate having a second array of apertures, the second baffle plate being joined to the first baffle plate, preferably in edge-to-edge relationship with the first plate, thus preferably forming an included angle with the first baffle plate, and extending across the gas flow channel at a second oblique angle to the longitudinal axis. The second oblique angle is preferably different from the first oblique angle, and can be a mirror image of the first oblique angle.

In some embodiments, the baffle further comprises a backwash valve secured over one of the baffle plates.

Where the baffle is comprised of first and second plates, the plates in some embodiments form a fixed included angle therebetween of about 100 degrees to about 130 degrees. Where more than two plates are used, the magnitude of the first plate angle with respect to the longitudinal axis is preferably different from the magnitude of the second plate angle and included angles between the plates are typically no more than 90 degrees.

In preferred embodiments, the magnitudes of the first and second plate angles with respect to the longitudinal axis cooperate with each other in attenuating different sonic frequencies of exhaust gases passing through the baffle.

In some embodiments, at least one of the first and second arrays of apertures comprises individual apertures each defining a like projected aperture area and wherein the apertures in the aperture configuration are uniformly spaced from each other.

In other embodiments, at least one of the first and second arrays of apertures comprises respective ones of the apertures in the given array which define different projected aperture areas and wherein the apertures in the aperture configurations are not uniformly spaced from each other.

Preferably, the first and second aperture configurations are different and complement each other in attenuating sonic energy in exhaust gases, and preferably in controlling back pressure exerted by the exhaust gases and passing through the baffle along the longitudinal axis.

In some embodiments, at least one of the aperture configurations comprises at least one of plural aperture sizes and plural aperture designs.

In preferred embodiments, the baffle plates are substantially planar.

In a second family of embodiments, the invention comprehends baffles used in exhaust systems of the invention, In preferred such baffles, the aperture configurations in the respective baffle plates are different and distinct from each other.

In preferred embodiments of the baffles having at least three baffle plates, optionally four or more baffle plates, and wherein each baffle plate defines, in edge view, a plate angle with the longitudinal axis, at least one plate angle is different from another such plate angle.

A backwash valve can be secured over one of the baffle plates, preferably a terminal one of the plates such as a tip plate.

In a third family of embodiments, the invention comprehends an in-line sound attenuating exhaust system for use in combination with an internal combustion engine. The sound attenuating exhaust system comprises an exhaust pipe having first and second ends, and a length between the first and second ends, an inner surface, an outer surface, a gas flow channel, and a longitudinal axis of the exhaust pipe; and a sound-attenuating baffle disposed in the exhaust pipe, the baffle comprising a first baffle plate having a first exhaust receiving surface, a first exhaust discharging surface, a first perimeter wall, and a first array of apertures extending between the first exhaust receiving surface and the first exhaust discharging surface, and a second baffle plate, joined to the first baffle plate, the second baffle plate having a second exhaust receiving surface, a second exhaust discharging surface, a second perimeter wall, and a second array of apertures extending between the second exhaust receiving surface and the second exhaust discharging surface. The first and second perimeter walls define a combined projected perimeter of the baffle along a common projection of the first and second perimeter walls, thereby to define a second longitudinal axis of the sound-attenuating baffle. The first and second arrays of apertures define respective first and second aperture configurations, different and distinct from each other.

In preferred embodiments, the sound-attenuating baffle is oriented in the pipe such that exhaust gases approach the second exhaust receiving surface after approaching the first exhaust receiving surface, and after passing through the first array of apertures.

In some embodiments, the sound-attenuating baffle is disposed adjacent an outlet end of the exhaust pipe.

In some embodiments, the first and second baffle plates define respective first and second different plate angles with the second longitudinal axis.

In preferred embodiments, the sound attenuating baffle has a length, taken along the second longitudinal axis, of no more than about 36 inches, and the exhaust system is effective to reduce sonic intensity of internal combustion engine exhaust passed therethrough by at least 3 decibels.

In attainment of such sound attenuation, and especially where the length of the baffle is so limited, the exhaust system can employ an imperforate outer wall of he exhaust pipe at the baffle location, a perforate inner wall, and an outer sound attenuation chamber between said outer and inner walls. The baffle plates have sufficient sound-deflection surface area, and are disposed at such angles with respect to gas flow through the baffle, as to deflect substantial portions of a gas, traversing the exhaust pipe, toward the outer chamber, as to both enhance mixing of gases traversing the exhaust pipe and to cause movement of such gases through the inner wall of the exhaust pipe into the outer sound-attenuation chamber.

In preferred embodiments, the baffle and exhaust pipe, in combination, define a friction fit between the inner surface of the exhaust pipe and the first and second perimeter walls of the baffle plates. Typically, the perimeter walls of the baffle plates are in surface-to-surface contact with the inner surface of the respective exhaust pipe along the full lengths of the perimeter walls so as to enhance frictional holding of the baffle and to limit the amount of gas which leaks past the plate at the perimeter wall.

The baffle is made from material having sufficient bending resilience, and the friction fit is cooperatively configured, such that force exerted on the exhaust receiving surface of the first e.g. input plate increases the intensity of the friction defined by the friction fit between the exhaust pipe and the baffle plate.

In the friction fit embodiments, the perimeter walls are preferably free from apertures thereby to enhance bending resistance and corresponding friction fit strength at the perimeter walls.

In preferred embodiments employing multiple baffle plates, each combination of adjacent facing baffle plates, in combination with a portion of the inner surface of the exhaust pipe, defines a sound-attenuation chamber having a maximum-area longitudinal cross-section and cross-section configuration, and no cross-section configuration represents more than 50 percent of such cross-sections in the baffle.

In some such embodiments, each sound-attenuation chamber defines a unique maximum-area longitudinal cross-section configuration such that each sound attenuation chamber preferentially attenuates a different range of sound frequencies.

Preferably, no pair of once-removed sound-attenuation chambers define the same cross-section configuration. As used herein, a once-removed sound-attenuation chamber has a single sound attenuation chamber longitudinally spaced between itself and a reference sound attenuation chamber.

A specific example of a preferred baffle has, in sequence, a first baffle plate defining a perpendicular angle with the longitudinal axis of the baffle, a second baffle plate defining a 45 degree angle with the longitudinal axis of the baffle, a third baffle plate defining a perpendicular angle with the longitudinal axis of the baffle, and a fourth baffle plate defining a 35 degree angle with the longitudinal axis of the baffle.

In another specific example of preferred baffles of the invention a first baffle plate defines, in sequence, a 75 degree angle with the longitudinal axis of the baffle, a second baffle plate defines a 65 degree angle with the longitudinal axis of the baffle, a third baffle plate defines a perpendicular angle with the longitudinal axis of the baffle, and a fourth baffle plate defines a 35 degree angle with the longitudinal axis of the baffle.

In some preferred baffles, each baffle plate defines on the respective exhaust-receiving surface, a unique angle or angle pattern with respect to the longitudinal axis of the baffle.

In a further family of embodiments, an in-line sound attenuating exhaust system for use in combination with an internal combustion engine comprises the exhaust pipe, and a baffle disposed in the exhaust pipe. The baffle comprises a first generally elliptical baffle plate having a first exhaust receiving surface, a first exhaust discharging surface, a first perimeter wall, and a first array of apertures extending between the first exhaust receiving surface and the first exhaust discharging surface, and a second generally elliptical baffle plate, joined to and crossing the first baffle plate at a single line of intersection extending across widths of the first and second baffle plates, the second baffle plate having a second exhaust receiving surface, a second exhaust discharging surface, a second perimeter wall, and a second array of apertures extending between the second exhaust receiving surface and the second exhaust discharging surface.

In preferred such embodiments, the line of intersection is preferably a straight line.

In some embodiments, the elliptical configurations of the first and second baffle plates are so designed in combination with the exhaust pipe and the line of intersection that the baffle is configured such that substantial portions of the perimeter walls engage the inner surface of the exhaust pipe, and such that the line of intersection extends at an angle across the longitudinal axis of the exhaust pipe, wherein the baffle plates extend across a cross-section of the gas flow channel in the exhaust pipe so as to substantially close off gas flow around the baffle plates at the perimeter walls and to define an entrance surface of the baffle defined in part by each of the first and second baffle plates and receiving initial baffle exposure to exhaust gases traversing the gas flow channel of the exhaust pipe.

An exit surface of the baffle is defined in part by discharging surfaces of each of the first and second baffle plates and receives the last baffle exposure to exhaust gases traversing the exhaust pipe. First and second enclosures on opposing sides of the line of intersection are each defined by portions of the first and second baffle plates in combination with a portion of the inner surface of the exhaust pipe. Exhaust gases traversing such exhaust pipe pass through a first set of apertures in the baffle plates at the entrance surface thus to enter the enclosures, and pass through a second different set of apertures in the baffle plates toward the exit surface thus to exit the enclosures and accordingly to exit the baffle.

In preferred such embodiments, the exhaust pipe comprises an imperforate outer wall, a perforate inner wall, and an outer sound attenuation chamber between the outer and inner walls. The baffle plates have sufficient sound-deflection surface area, and are disposed at such angles with respect to gas flow through the baffle, as to deflect substantial portions of a gas, traversing the exhaust pipe, toward the outer chamber, so as to both enhance mixing of gases traversing the exhaust pipe and cause movement of such gases through the inner wall of the exhaust pipe into the outer sound-attenuation chamber.

In other embodiments of the invention, the first and second baffle plates are substantially planar, the first and second baffle plates extend transversely across substantially a full width of the gas flow channel at oblique angles, the first and second baffle plates are oriented parallel to each other and are spaced from each other along the length of the exhaust pipe with sufficient generally open space therebetween to define a useful sound-attenuation chamber.

In such baffles the multiple baffle plates are preferably joined to each other by brackets extending between respective ones of the baffle plates whereby the baffle is a unitary assembly.

BRIEF DESCRIPTION OF THE DRAWINGS

FIGS. 5A and 5B show top and side edge views of a first 4-plate wave-style baffle.

Figure 1:
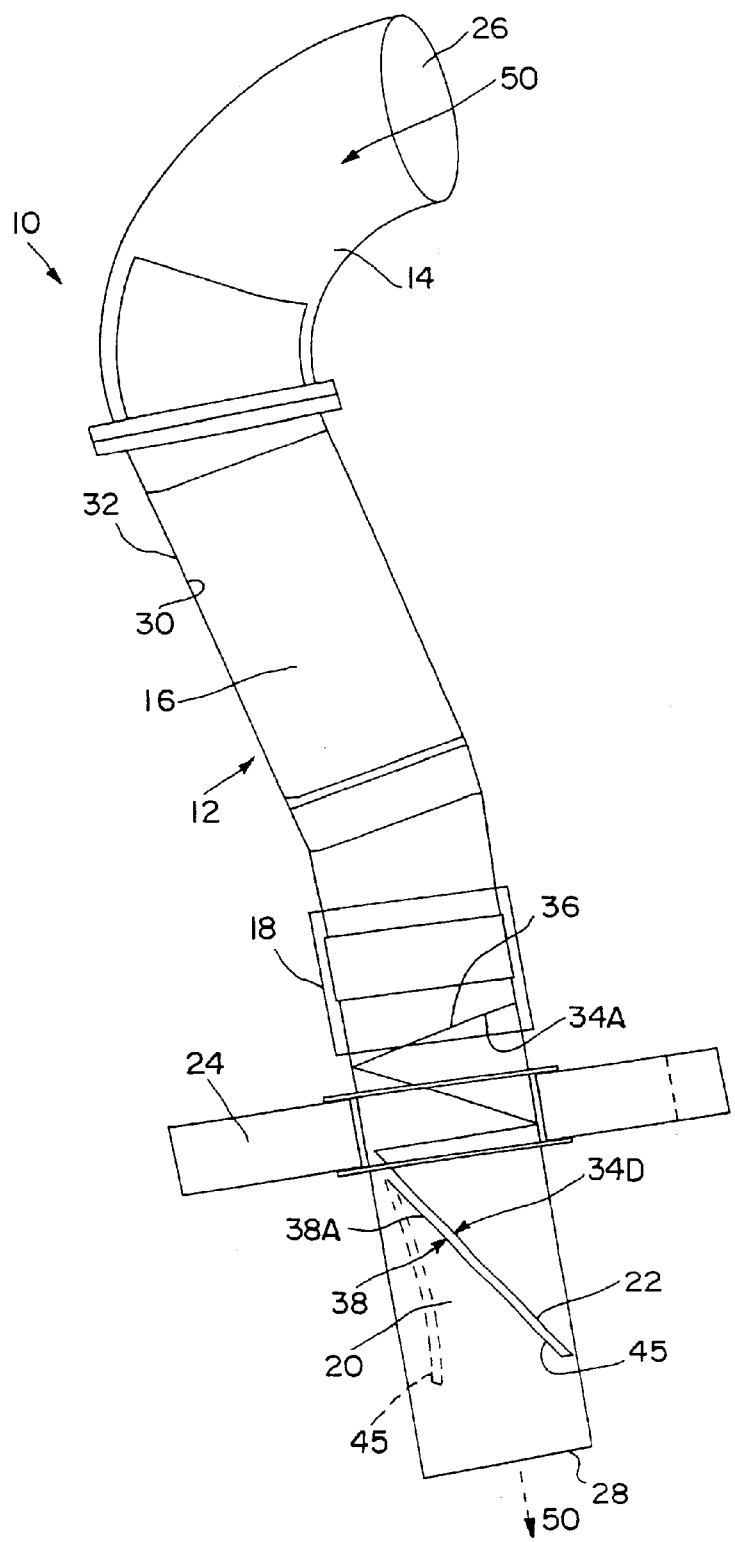
FIG. 1 is a cross-sectional side view of an exhaust system of the invention employing a wave-style tip baffle.

The invention is not limited in its application to the details of construction or the arrangement of the components set forth in the following description or illustrated in the drawings. The invention is capable of other embodiments or of being practiced or carried out in other various ways. Also, it is to be understood that the terminology and phraseology employed herein is for purpose of description and illustration and should not be regarded as limiting. Like reference numerals are used to indicate like components.

DESCRIPTION OF THE ILLUSTRATED EMBODIMENTS

Figure 2:
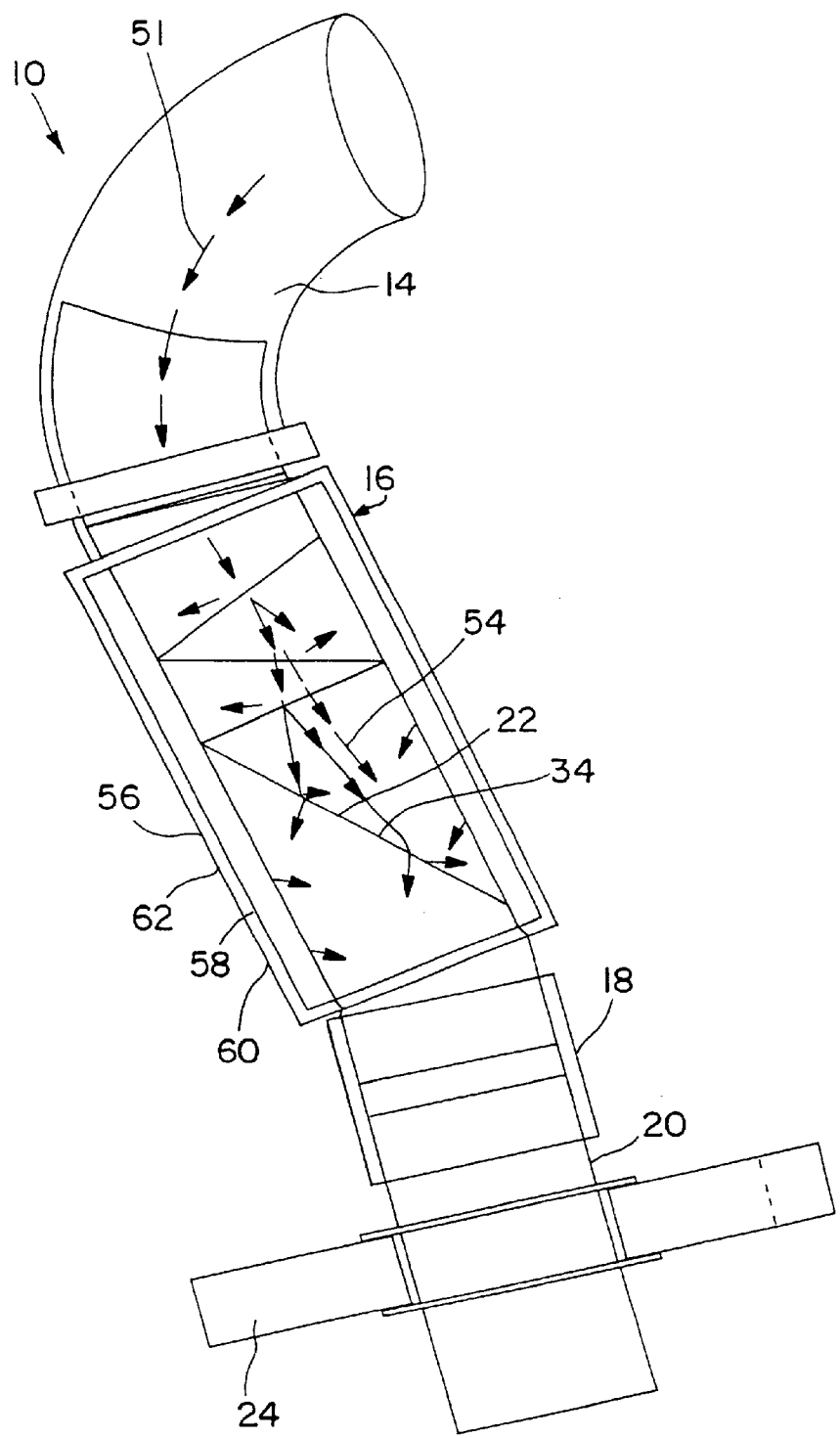
FIG. 2 is a cross-sectional side view of a water-jacketed marine exhaust system of the invention employing a wave-style baffle located upstream of the exhaust tip, and upstream of the transom of the boat.

FIGS. 1 and 2 show overall large-scale representative side elevation cross-sections of first and second embodiments of exhaust systems of the invention in combination with a cross-section representation of the transom of a boat. FIG. 1 shows, in general, use of an exhaust system of the invention wherein the baffle extends through the transom of the boat and is located proximate the exhaust tip. The exhaust system of FIG. 1 includes a backwash check valve, and operates within the cross-section of an exhaust pipe which is sized to convey the exhaust gases of the engine to which it is attached, considering only the quantity of gases to be carried and back pressure attendant conventional sound-attenuation structures. Namely, the size of the exhaust pipe is selected without providing a size enlargement to accommodate any effect of the use of an in-line sound-attenuating baffle in the exhaust pipe.

In FIG. 2, the baffle is located upstream of the boat transom, does not include a backwash valve, and is housed in a muffling structure which is modestly enlarged as compared to the exhaust pipe, itself, in order to accommodate an outer sound attenuation chamber which cooperates with the baffle, as well as a water jacket which provides cooling to the exhaust gases exiting the engine.

Referring now back to FIG. 1, an exhaust system 10 is used in combination with conventional internal combustion engines (not shown) to reduce sound or noise emitted by the explosive-type release, from the engine, of combusted air/fuel mixtures. Exhaust system 10 comprises a series of exhaust pipes 12 including header 14, tailpipe 16, coupling 18, and exhaust tip 20, at least one of which receives and holds sound attenuation baffle 22. The exhaust system passes through transom 24 at exhaust tip 20. The exhaust system has an anterior end 26, disposed toward the engine, from which the anterior end receives hot exhaust gases at header 14. The exhaust system further comprises a posterior end 28, remote from the engine, which is configured for discharging exhaust gases at the exhaust tip 20. FIGS. 1 and 2 illustrate first and second embodiments of longitudinal cross-sections of exhaust systems of the invention. Each of the exhaust pipes 12 has an inner wall surface illustrated at 30 and an outer wall surface illustrated at 32. Generally, the inner wall surfaces of the exhaust pipes define the gas flow channel through which exhaust gases pass, after being expelled from the engine, to the ambient atmosphere.

Sound attenuation baffle 22 is comprised of one or more baffle plates 34. The baffles illustrated in FIGS. 1 and 2 are wave baffles and each comprise four baffle plates 34A, 34B, 34C, 34D, joined to each other at opposing edges of the respective baffle plates.

Baffle plates 34 are made of material which is capable of tolerating the high temperatures and corrosive gases which accompany the exhaust gases emitted from the internal combustion engine, as well as being sufficiently rigid and sturdy to withstand the operating conditions extant inside the exhaust pipes. Typical such materials are e.g. certain metals and ceramics, and metal/ceramic hybrids or combinations.

Thus, for example, the baffle plates can be made of temperature tolerant steel about 0.040 inch to about 0.125 inch thick. A particularly preferred material for baffle plates 34 is a 14 gauge sheet of 304 stainless steel.

Each baffle plate has an exhaust receiving surface 36, an exhaust discharging surface 38, a perimeter wall 40, and an array of apertures 42 which extend through the thickness of the respective baffle plate between the exhaust receiving surface and the exhaust discharging surface.

Figure 6A:
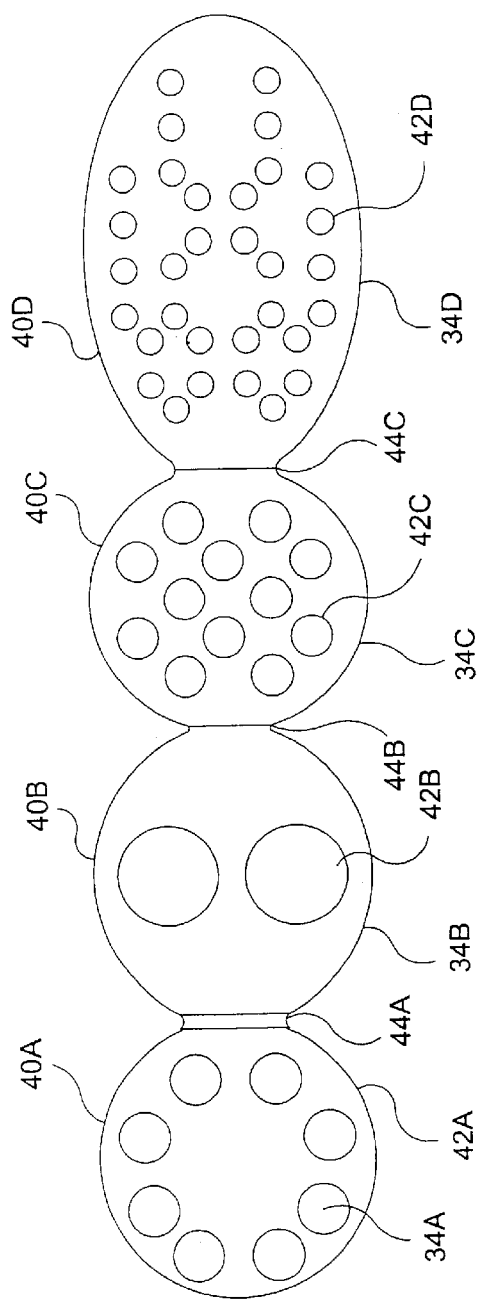
FIGS. 6A and 6B show top and side edge views of a second 4-plate wave-style baffle.

Returning now to FIGS. 1, 2, 6A, and 6B, exhaust systems are shown in cut-away side elevation in FIGS. 1 and 2. FIG. 6A shows a wave baffle 22 in top view before the angles illustrated in FIGS. 1, 2, and 6B have been formed in the baffle work piece. Thus, the view of FIG. 5A represents a view from an angle perpendicular to each of plates 34A, 34B, 34C, 34D.

Referring again to all of FIGS. 1, 2, 6A, and 6B, exhaust input plate 34A has an exhaust receiving surface 36A, an exhaust discharging surface 38A, a perimeter wall 40A, and an array of apertures 42A. Dispersal plate 34B has an exhaust receiving surface 36B, an exhaust discharging surface 38B, a perimeter wall 40B, and an array of apertures 42B. Mixing plate 34C has an exhaust receiving surface 36C, an exhaust discharging surface 38C, a perimeter wall 40C, and an array of apertures 42C. Tip plate 34D has an exhaust receiving surface 36D, an exhaust discharging surface 38D, a perimeter wall 40D, and an array of apertures 42D. Tip plate 34D can also carry a backwash valve as suggested at 45 in FIG. 1.

Respective pairs of plates 34A, 34B, 34C, and 34D define therebetween sound-attenuation chambers 46. Thus plates 34A and 34B define sound attenuation chamber 46A therebetween. Plates 34B and 34C define sound attenuation chamber 46B therebetween. Plates 34C and 34D define sound attenuation chamber 46C therebetween. Each such sound attenuation chamber has a maximum-area longitudinal cross-section and cross-section configuration in the edge view of that respective chamber, or e.g. in a view as close as possible to an edge view. Such maximum-area longitudinal cross-section is, in preferred embodiments, generally representative of the 3-dimensional cross-section of the respective sound attenuation chamber where e.g. the exhaust receiving surfaces of the respective baffle plates are in the desired planar configuration. The baffle plates and the respective exhaust pipe are designed and configured, and oriented with respect to each other, so as to provide a desired sound attenuation affect at the exhaust end of the exhaust tip.

Plates 34A and 34B are connected to each other in edge-to-edge relationship by a metal connector bridge 44A. Plates 34B and 34C are connected to each other in edge-to-edge relationship by a metal connector bridge 44B. Plates 34C and 34D are connected to each other in facing edge relationship by a bridge plate 44C. Such edge-to-edge connections define baffles referred to herein as "wave" baffles.

Figure 7A:
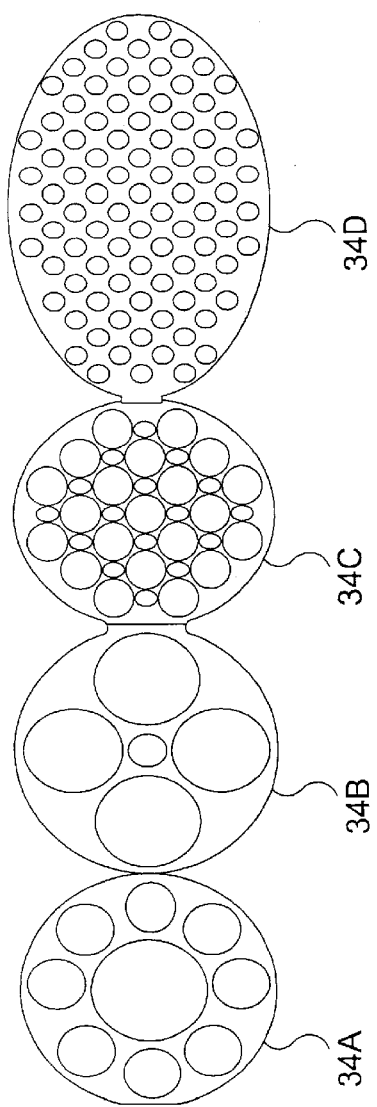
FIGS. 7A and 7B show top and side edge views of a third 4-plate wave-style baffle.

The lengths of bridges 44A and 44B are illustrated as just great enough to make the connection between the respective plates in combination with making allowance for the bending of the metal between the plates, to accommodate the angles between plates as described in more detail hereinafter, when making the baffle e.g. from a single piece of metal stock. By contrast, bridge plate 44C is longer than required by such bending and connecting considerations, thus to additionally space tip plate 34D from mixing plate 34C by a desired distance, for example to tune the acoustic affect of chamber 46C, or to better position a backwash check valve 45, being carried on tip plate 34D, closer to the posterior end of the exhaust pipe at exhaust tip 20. In some embodiments, for example as illustrated in FIGS. 6A and 7A, bridges 44 can be so short as to be embodied in portions of the plates such that separate bridge structures are not apparent.

In all the embodiments, and through all the bridges and bridge plates, the baffle plates are held at generally fixed angles with respect to each other. Such angles can be changed slightly such as by up to about 5 degrees when a baffle is inserted, installed in an exhaust pipe, whereby the change in angle can be part of the friction-fitting mechanism for holding the baffle in place in the respective pipe.

As illustrated in the various drawings, typically the array of apertures in each baffle plate in a baffle defines a unique aperture pattern wherein both the outlines of the individual apertures and the arrangement of the apertures on the respective baffle plate are different from the outlines and arrangements in all the other plates in the respective baffle. Such variation in aperture outline and/or aperture arrangement typically enhances the ability of the baffle to attenuate a variety of sound frequencies, as well as to break up the gas flow and cause mixing of the gases to thereby disrupt sonic energy conveyance by such gases. The selections of the aperture outlines and aperture arrangements depends on the sound frequencies and sound intensities to be conveyed and attenuated for a given implementation, whereby the specific aperture outlines and arrangements will be selected individually for each specific implementation of baffles of the invention. In some implementations, the aperture outline and arrangement can be the same, or mirror images of each other, in two or more of the baffle plates.

The basic principles of the invention, of aperture fraction of the cross-section of the exhaust pipe, of plate fraction of the plate area, and of orienting at least one of the baffle plates at an oblique angle to longitudinal axis 48 of the exhaust pipe, are consistent in all implementations of the invention. Similarly, a longitudinal axis 52 of the baffle is typically coincident with longitudinal axis 48 of the pipe.

The number of baffle plates in a baffle can be as few as one and up to about 10 plates. Typically at least two plates are used in order to provide sound attenuation at a suitable number of frequencies. A baffle using four plates can typically provide the desired level of sound attenuation at desired ranges of frequencies. More than four plates can be used to enhance either or both the number of frequencies treated and the degree of sound attenuation. But again, the greater the number of plates, which is desirable for sound attenuation purposes, potentially the greater the prospect that undesired levels of back-pressure may be developed, which undesirably reduces engine power, by forcing the exhaust gases to pass through the increased number of baffle plates. Accordingly, the number of baffle plates is typically limited to no more than six plates.

In preferred embodiments, the exhaust receiving surface and the exhaust discharging surface of any given baffle plate are planar in configuration and are smooth in surface texture. The planar configuration provides for a consistent deflection angle for deflecting sound waves and exhaust gases away from the direction of extension of the longitudinal axis of the respective exhaust pipe. The smooth surface texture of the baffle plates promotes predictable and uniform acceptance and deflection of exhaust gases as the exhaust gases reach the respective baffle plates, as well as predictable discharge and release of the exhaust gases as the exhaust gases move through and past the baffle plate.

However, it is contemplated that one or both of the exhaust receiving surface and the exhaust discharging surface may, in some embodiments, be convex, concave, rippled, undulating, wavy, angular, dimpled, beveled at the apertures, or otherwise configured such that one or both of such surfaces are not entirely flat. Likewise, it is contemplated that the exhaust receiving surface may be abrasive, pitted, etched, grooved, channeled, or otherwise textured so as to not be smooth. It is understood that the moniker "smooth" is a relative term whereby no surface is perfectly smooth.

Thus, as used herein, the word "smooth" is meant in its common interpretation, whereby a person casually feels a surface and draws a conclusion as to the surface being "smooth," or not, from such casual feel of the surface.

Figure 6B:
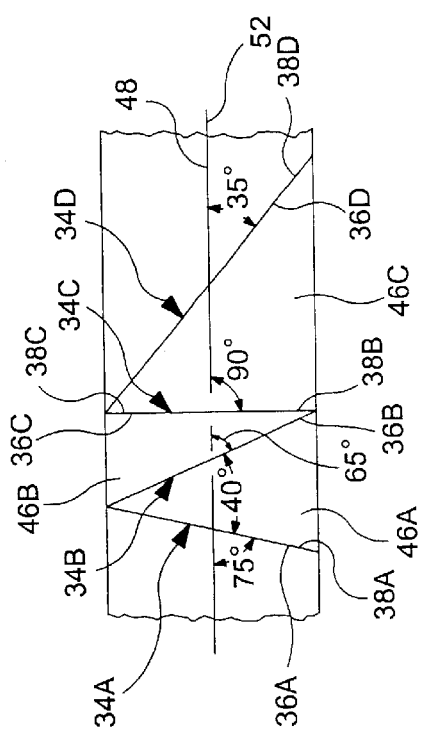

Referring again to FIGS. 1, 2, 6A, and 6B, a given baffle plate can define a wide range of angles with respect to either longitudinal axis 48 of the pipe or longitudinal axis 52 of the baffle. Referring specifically to FIG. 6B, the baffle plates illustrate angles of 35 degrees at plate 34D to 90 degrees at plate 34C. Plates 34B and 34A respectively define angles of 75 degrees and 65 degrees. Such angle can be as low as about 25 degrees, in some instances 20 degrees. However, the smaller the angle, the longer the baffle plate and the less the combined affect of deflection angle and aperture area as projected along the direction of extension of longitudinal axis 48 although the greater the potential open area of the plate. The plate angle is measured at the side of the plate which constitutes the leading edge of the plate as encountered by exhaust gases traversing the baffle. Accordingly, typical angles are between about 30 degrees and 90 degrees.

The lesser the angle between the plate and axis 48, the greater the tendency of the plate surface to deflect exhaust gases toward the inner surface of the respective exhaust pipe, thereby to disrupt and absorb the sonic energy of the exhaust gases. Such deflection adds stress to the gas flow rate of the exhaust gases. However, the elongate shape of such low-angle plate provides ample opportunity for a satisfactory quantity of open aperture area for that plate. However, increasing the aperture area reduces the effectiveness of the deflection function of the plate surface area. Thus, a compromise is required between plate angle and aperture area, whereby plate angle is typically between about 35 degrees and 90 degrees, while aperture area is typically between about 10 percent and about 80 percent of the plate area.

For a given baffle plate, the array of apertures generally takes up a substantial fraction of the area defined by the respective perimeter wall 40. The apertures generally occupy at least 15 percent of the area so defined, preferably at least 25 percent of the area so defined, up to about 85 percent to less than about 90 percent, of the area. Preferred aperture areas define about 17 percent to about 75 percent of the area of the respective baffle plate. More preferred aperture areas define about 20 percent to about 40 percent or 50 percent of the area of the baffle plate.

Figure 8A:
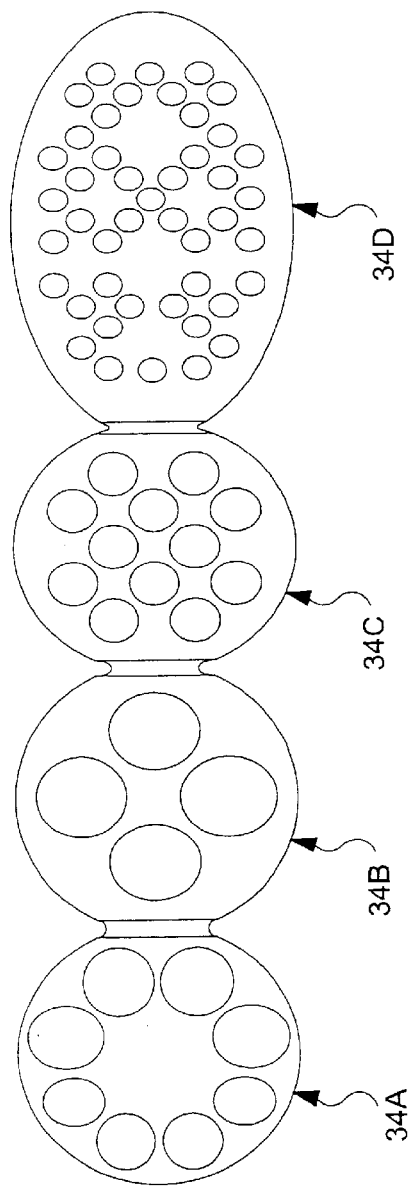
FIGS. 8A and 8B show top and side edge views of a fourth 4-plate wave-style baffle.

Table 1 illustrates the approximate percentage of the baffle plates occupied by apertures 42 in the baffles illustrated in FIGS. 6A, 7A, and 8A.

TABLE 1

| Plate Identification | Aperture Area Percent | | |
|---|---|---|---|
| | FIG. 6A | FIG. 7A | FIG. 8A |
| Input Plate 34A | 29% | 78% | 42% |
| Dispersal Plate 34B | 17% | 39% | 44% |

TABLE 1-continued

| Plate Identification | Aperture Area Percent | | |
|---|---|---|---|
| | FIG. 6A | FIG. 7A | FIG. 8A |
| Mixing Plate 34C | 28% | 45% | 44% |
| Tip Plate 34D | 10% | 32% | 38% |

Table 1 illustrates that the input plate generally has a relatively larger aperture fraction, based on the plate area as defined by the perimeter wall, than the tip plate, and that the tip plate typically has a relatively smaller aperture fraction, with the mixing plate typically having a larger aperture fraction than the dispersal plate. The aperture fraction relationships can, however, vary from implementation to implementation because of the wide variety of internal combustion environments, the wide variety of vehicle operating condition environments which are encountered in ordinary engine use, and the appurtenances which can be employed in combination with baffle 22 such as the outer chamber 50.

Complementary areas of the baffle plate are respectively defined by the plate surface. Thus, greater than 10 percent, typically about 15 percent to about 25 percent, and up to as great as percent, 75 percent, or 85 percent, of the area of a respective baffle plate, as defined by the perimeter wall, is defined by plate surface area, such as area of the exhaust receiving surface or area of the exhaust discharging surface.

The inventor herein has discovered that a substantial factor in controlling back pressure is related to the absolute combined open area of all the apertures in a baffle plate. One way to provide a large open area is to have many apertures, and to have the apertures be as large as possible. The inventor herein has discovered that another way to effectively control back pressure is satisfied by the absolute open area of the plate, irrespective of the overall plate area. Thus, the plate can be positioned into a low-angle orientation with respect to the axis of the exhaust pipe, whereupon the plate is elongated as an ellipse in order to maintain perimeter edge contact with the inner surface of the exhaust pipe about the entire perimeter of the exhaust pipe and the plate. Such elongation of the plate increases the magnitude of the plate area which is available for use in creating aperture area. By using such low angle plate as a control, the baffle, and thus the exhaust system, can be tuned for use with a respective engine thus to provide maximum sound attenuation while maintaining an acceptable back pressure.

For example, a given engine requires a certain flow rate of exhaust gases. The exhaust pipe is thus sized to accommodate such flow rate, assuming conventional back pressure. A suitable baffle 22 can be inserted into such exhaust pipe, with suitable tuning of the baffle, thereupon to attenuate the engine sound while developing acceptable levels of back pressure.

The inventor herein has surprisingly discovered that a substantial factor in controlling back pressure is the absolute combined open area provided by all apertures in a baffle, as well as aperture distribution. One way to provide large open areas is to have many apertures, and as large apertures as possible. Another way to provide a large open area is to orient the plate along the axis of the exhaust pipe, to elongate the shape of the plate accordingly, and to aperture such plate as desired. the inventor herein has discovered that the critical fraction of open area for comparison and evaluation is not to compare open area to area of the plate as in Table 1. To the contrary, the critical fraction is a comparison of absolute open area of the plate to t=open cross-sectional area of the gas flow channel of the exhaust pipe in which the baffle is contained.

A substantial finding of the invention is that exhaust noise can be effectively controlled by an in-line angled baffle in an exhaust pipe where the absolute open aperture area of each baffle plate is at least as great as, preferably greater than, the aperture area of the next adjacent plate upstream of the gas flow, of the plate being evaluated. Table 2 illustrates such aperture area relationship.

TABLE 2

| Plate No. | Aperture Size/Stagger | Total Pipe Sq In Area | Percent Open | Sq In Open | Comp Dia. Tube, Inches |
|---|---|---|---|---|---|
| 1A | 3/16–1/4 | 19.07 | 0.32 | 6.10 | 2.8 |
| 1B | 3/16–5/16 | 19.07 | 0.4 | 7.62 | 3.1 |
| 1C | 1/4–5/16 | 19.07 | 0.5 | 9.54 | 3.5 |
| 1D | 1/4–3/8 | 19.07 | 0.58 | 11.06 | 3.8 |
| 2A | 3/16–1/4 | 10.42 | 0.32 | 3.33 | 2.1 |
| 2B | 3/16–5/16 | 10.42 | 0.4 | 4.17 | 2.3 |
| 2C | 1/4–5/16 | 10.42 | 0.5 | 5.21 | 2.6 |
| 2D | 1/4–3/8 | 10.42 | 0.58 | 6.04 | 2.8 |

Table 2 represents hypothetical baffles 1 and 2 of the invention, including plates A, B, C, and D in each plate. Baffle 1 is sized to fit into a 4-inch nominal diameter exhaust pipe. Baffle 2 is sized to fit into a 3.5 inch nominal diameter exhaust pipe. The baffles illustrated in Table 2 have the nominal angles illustrated in FIGS. 6B, 7B, and 8B. Column 2 indicates the aperture sizes, followed after the hyphen by the center-to-center distance between apertures. The total pipe area represents the cross-sectional area of the gas flow channel in the exhaust pipe. Percent open area is a mathematical calculation based on the known aperture sizes and spacings given in column 2. The square inches open is the open area represented by all apertures in a plate of the given size. The final column in Table 2 provides the comparable pipe size which would have the same open area as the respective plate. Thus, plate 1B has a perimeter which fits inside a 4-inch nominal diameter pipe and can convey the same quantity of gas as a pipe having an inside diameter of 3.1 inches. Similarly, plate 2D has a perimeter which fits inside a 3.5-inch nominal diameter pipe and can convey the same quantity of gas as a pipe having an inside diameter of 2.8 inches.

The potential area of the plate surface and the apertures of a given baffle plate depend on the angle defined by the respective plate with respect to the longitudinal axis. In addition, the open area available for traverse of exhaust gases is modified, namely increased, to the extent the exhaust system includes an outer sound attenuation chamber 50.

In general, all of the plate area is defined by a combination of area of the plate surface and areas of the apertures. The division of plate area between plate surface and aperture area represents a tension between competing interests. The greater the aperture area the easier it is for exhaust gases to flow through the baffle. The greater the plate surface area, the more the direction of flow of the exhaust gases can be controlled, mixed, and otherwise manipulated for sound attenuation purposes. In order to have good directional control of gaseous flow, it is critical that greater than about 10 percent of the plate area be defined by plate surface. Similarly, in order to achieve sufficient gas flow through the baffle, it is desired that the apertures comprise at least 10 percent of the plate area, or that other provision be made for the exhaust gases to move past the respective baffle plate.

In addition to the affect of angles between the baffle plates and axis 48, the effectiveness of the baffle is further affected by the angles between respective ones of the baffle plates. FIG. 2 illustrates the concept at arrows 54 that the angle of the baffle, and the availability of apertures affects the direction of gas flow, and the fraction of the gas which flows in a given direction from and through each baffle plate.

Where plates are parallel, or nearly parallel, to each other, little beneficial affect attaches to the downstream plate unless the downstream plate is spaced a substantial distance from the upstream plate. Such spacing should support an individual sound attenuation chamber nominally at least as long, measured along axis 48, as at least 15 percent, preferably at least about 20 percent to about 25 percent, of the length of the shorter of the plates as measured along the longest axis of the respective plate. Such spacing can be longer, but the plates should, in any event, be close enough together that deflecting, mixing, and dissipating achieved at a first plate is still active when the gases reach the next subsequent plate. Thus, parallel, or near parallel, plates, while less preferred, are typically spaced apart by distances no greater than about 75 percent of the length of the shorter one of the plates as measured along the long axis of the respective plate.

Figure 7B:
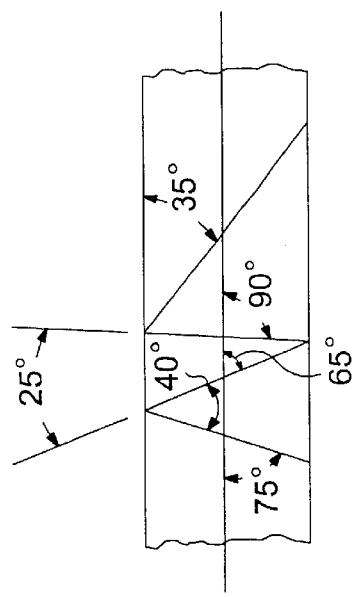
Figure 8B:
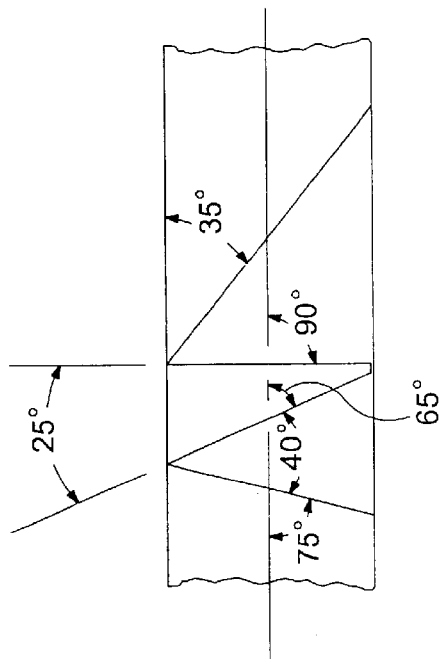

Thus, an angle of at least 15 degrees, up to about 135 degrees, is preferably defined between each pair of adjacent baffle plates. And normally no two adjacent baffle plates are parallel to each other unless substantially spaced from each other, or unless the aperture configurations in the two baffle plates complement each other so as to compensate for the parallelism, or near parallelism, of the plates. Thus, the plates in FIG. 5B are spaced from each other by 45 degrees, 45 degrees, and 55 degrees respectively. The plates in each of FIGS. 6B, 7B, and 8B are spaced from each other by 40 degrees, 25 degrees, and 55 degrees respectively.

In preferred embodiments, the baffle is longitudinally force fitted into one of the exhaust pipes whereby at least a portion of the perimeter wall of one or more of the baffle plates frictionally engages the inner surface of the respective exhaust pipe, In such embodiments, the exhaust input plate is preferably defined an angle with the longitudinal axis of less than 90 degrees, as measured from the free edge of the plate opposite bridge 44A. Given such angle, the material used in baffle 22 is selected to have bending resistance, and resilience when deflected, such that when frictionally engaged with the inner surface of the respective exhaust pipe, any pushing force on plate 34A, such as by flow of exhaust gas through the exhaust pipe, bends the baffle at bridge 44A and thus further jams, and frictionally engages, plate 34A against the inner surface of the exhaust pipe.

The lesser the angle of a plate 34 with axis 48, down to about 45 degrees, the greater the affect of such jamming on the exhaust receiving surface. At an angle less than 45 degrees, the jamming principle is less effective. Preferably the frictional engagement is initiated at the input plate as gases first engage the baffle. Preferably, the angle of the input plate with longitudinal axis 48 is less than 90 degrees whereby the leading edge of the input plate is upstream of bridge 44A. Given such relative positioning, forces exerted on the exhaust receiving surface of the input plate applies a coupling force tending to rotate the input plate about bridge 44A and in the direction of movement of the exhaust gases. Such rotational force enhances the force which provides the frictional engagement of the plate with the inner surface of the exhaust pipe. Accordingly, the greater the force exerted by the exhaust gases, the greater the frictional engagement of the baffle with the inner surface of the exhaust pipe.

As a design choice, one or more of the baffle plates or the entire baffle can be welded into the exhaust system. Likewise, the baffle or baffle plates can be secured by any conventional method such as rivets, a nut and bolt combination, or screws, or any other known connecting mechanism.

The outer boundary of each baffle plate is defined by a perimeter wall 40 e.g. 40A, 40B, 40C, 40D. The perimeter wall is defined as that surface which extends between the exhaust receiving surface and the exhaust discharging surface at the outer edge of the respective baffle plate. In preferred embodiments, the perimeter wall, and thus the outer perimeter of the respective baffle plate, when viewed from a perpendicular angle, as illustrated in FIGS. 3A, 4A, 5A, 6A, 7A, 8A defines a circle or ellipse, or other shape complementary to the cross-section of the exhaust pipe with which the baffle is to be assembled.

FIGS. 3A, 4A, 5A, 6A, 7A, 8A illustrate top views of respective embodiments of representative baffle plate work pieces before the work pieces are fabricated to form the plate-to-plate angles illustrated in the respective edge views of FIGS. 3B, 4B, 5B, 6B, 7B, 8B. The outer perimeters of the baffle plates, projected perpendicular to the plate surfaces, can be defined by a variety of shapes at the perimeter wall, for example circular, elliptical, arcuate, multiple-radiused, polygonal, or irregular polygonal.

The selected shape must be compatible with insertion into the selected exhaust pipe, and preferably is compatible with an insertion whereby the entirety, or nearly the entirety, of the perimeter wall of at least one, and preferably each, of the baffle plates, is in frictional engagement with the inner surface of the exhaust pipe into which the baffle is inserted. Such frictional engagement is preferably sufficiently restrictive of movement of the baffle toward posterior end 28 as to prevent any substantial such movement during operation of an engine to which such exhaust system is connected.

The term irregular polygonal is defined to mean any combination of polygonal shapes or configurations, including shapes which combine straight-line sections with arcuate sections of such perimeter walls. In preferred embodiments, the perimeter wall is perpendicular to the exhaust receiving surface and the exhaust discharging surface. However, the perimeter wall can define a different angle or series of angles with respect to either or both of the exhaust receiving surface and the exhaust discharging surface, for example to enhance the frictional engagement of the perimeter wall with the inner surface of the exhaust pipe. Further, the perimeter wall can be serrated, wavy, jagged, or can otherwise have a surface which engages the inner surface of the exhaust pipe intermittently. In some implementations, such intermittent engagement can aid the frictional engagement between the perimeter wall and the inner surface of the exhaust pipe.

Each array of apertures is comprised of individual apertures 42. Each array of apertures has a calculable magnitude of aperture area. For example, to obtain a first aperture area, the two dimensional areas of the respective apertures is calculated. The summed total of the areas of the individual apertures on the respective baffle plate represents the aperture area, and can be used to calculate the aperture fraction using the open area of the gas flow channel of the respective gas flow channel as the denominator. The calculation of aperture areas, and aperture area fractions, is similarly accomplished with respect to the second, third, fourth, and so on, baffle plates, respectively, in a given baffle.

Each inner aperture perimeter wall in a respective array can represent a unique aperture design as in plate 34D of FIG. 5A. However, in most baffle plates, the aperture array employs a given aperture design in multiple apertures.

The interior perimeter wall which defines a respective aperture generally extends transverse, typically perpendicular, to the exhaust receiving surface and the exhaust discharging surface. However, the diameter of the interior perimeter wall can increase or decrease as the aperture extends from the exhaust facing surface to the exhaust receiving surface. Likewise, the interior perimeter wall of each individual aperture can be configured other than perpendicular to either of the exhaust facing surface or exhaust discharging surface. Also, the interior perimeter wall of individual apertures typically represents a generally smoothly flowing line extending unbroken about the entire perimeter of the aperture, to facilitate efficient fluid flow of exhaust gases through the aperture.

As illustrated in FIGS. 3A, 4A, 5A, 6A, 7A, 8A, each plate 34 in a baffle preferably defines an aperture array unique to the respective baffle. In addition, the array of apertures in a given plate can include a variety of aperture configurations such as different sizes of circles, slots having different lengths or widths, or different aperture designs altogether such as slots and circles or circles and ellipses all in the same plate.

As used herein, the term "configuration" is non-exclusively used to refer to the number of individual apertures in an array on a given baffle plate, or the placement of or spacing between individual apertures in an array on each baffle plate.

The term "pattern" is non-exclusively used to mean a non-random aperture configuration comprising e.g. vertical elongate slots, horizontal elongate slots, arcuate elongate slots, circular slots, arcuate slots, concentric arcuate slots, or oblong slots, or any combination of the above or other apertures in a baffle plate.

Referring now specifically to FIG. 2, there is shown an embodiment of the invention where baffle 22 is located in the tail pipe section 16 of the exhaust system. The tail pipe includes an outer tube 56, an inner tube 58, and a perforated tube 60 disposed inwardly of the inner tube. A water jacket 62, namely an empty water-receiving cavity, is disposed between outer tube 56 and inner tube 58. Sound attenuating packing material such as randomly-entangled wire mesh is preferably disposed in outer sound attenuation chamber 50, namely the space between inner tube 58 and perforated tube 60. Other materials known for sound attenuation in exhaust gas environments, such as fiberglass, can be used in place of the wire mesh. In some embodiments, outer attenuation chamber 50 can be employed as an empty cavity.

Arrows 54 illustrate that the effect of baffle plates 34 is that apertures 42 convey portions of the gases through the plates while the sections of plate surface deflect other portions of the gases toward perforated tube 60 and into chamber 50.

A first affect of deflecting portions of the gases to chamber 50 is to relieve some of the pressure inside the confines of perforated tube 60 by providing a relief escape path for such gases as traverse chamber 50. A second affect of deflecting portions of the gases is that those gases which enter chamber 50 are subjected to the cooling affect of the water in water jacket 62, thereby to reduce the volume of such gases, along with a corresponding relief of a corresponding level of the pressure extant in such gases. A third affect of deflecting portions of the gases is that such gases pass through the packing material, releasing portions of the contained sonic energy to such packing material.

In general, the embodiment of FIG. 2 is designed to be used in a relatively higher energy environment, but employs the baffle close to the engine in order to combine the water cooling feature reasonably close to the engine in combination with sound attenuation where the water jacket can be most effective in the sound attenuation project.

By contrast, the embodiment of FIG. 1 provides employs backwash valve 45 which is most useful adjacent posterior end 28, namely adjacent where the exhaust gases exit the exhaust system. In such location, a water jacket is generally less beneficial in avoiding failure of the header pipe whereby water jacketing about baffle 22 is less beneficial and therefore not employed.

In general, FIGS. 3A, 3B and 4A, 4B illustrate wave baffles 22 each made up of 2 baffle plates 34A and 34B, the plates being joined together through respective bridges 44. The included angle between the plates is 120 degrees in FIG. 3B and 110 degrees in FIG. 4B. The respective plates in each of FIGS. 3A and 4A include exhaust receiving surfaces 36A, 36B, and exhaust discharging surfaces 38A, 38B, and apertures 42A, 42B extending between the exhaust receiving surfaces and the exhaust discharging surfaces. Each such plate also includes perimeter walls 40A, 40B on the respective plates 34A, 34B.

Figure 3A:
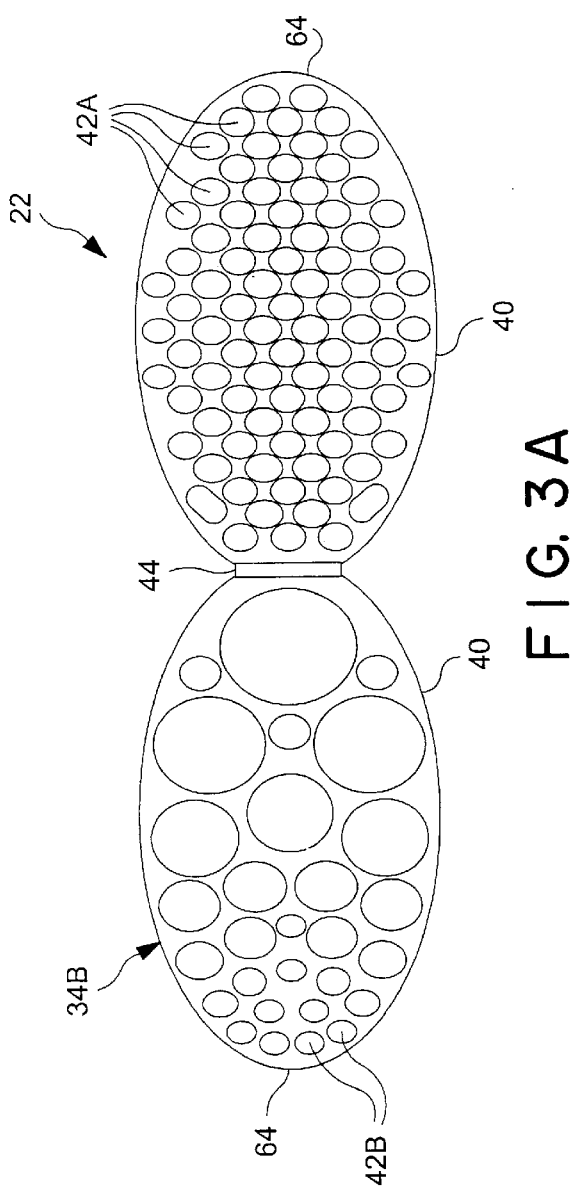
FIGS. 3A and 3B show top and side edge views of a first 2-plate wave-style baffle.

The apertures in both plates in FIG. 3A are all circles. The apertures in plate 34B vary in size from rather smaller circles adjacent remote trailing edge 64 to substantially larger circles adjacent bridge 44. Most of the apertures in plate 34A of FIG. 3A are circles, with two slotted apertures adjacent bridge 44.

Figure 3B:
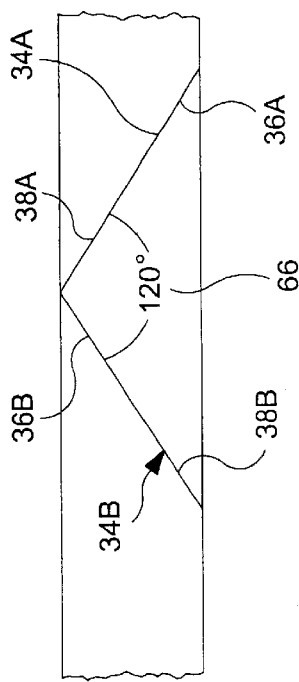
Figure 4A:
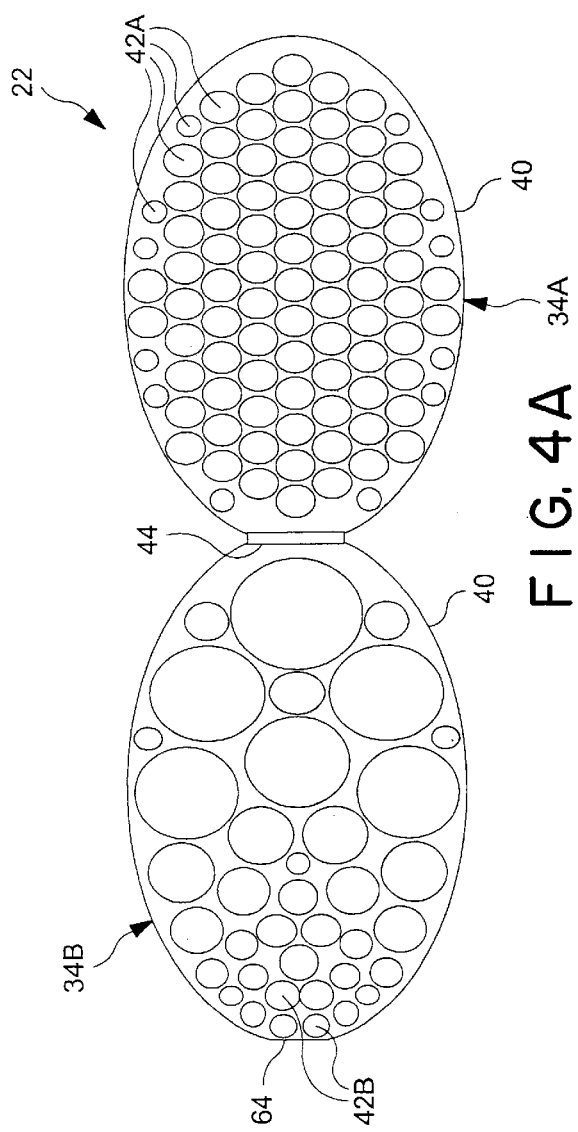
FIGS. 4A and 4B show top and side edge views of a second 2-plate wave-style baffle.
Figure 4B:
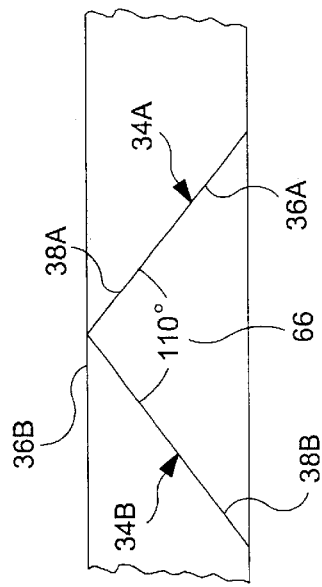

The apertures in baffle plate 34B of FIG. 4A are all circles, again with rather smaller circles adjacent the remote trailing edge and larger circles adjacent bridge 44. The apertures in plate 34A of FIG. 4A are all circles. Most of the apertures are of a common relatively smaller size, with a few even smaller size circles adjacent perimeter wall 40. Direction of gas flow in each of FIGS. 3A, 3B is from plate 34A toward plate 34B. FIGS. 3A, 3B, 4A, 4B thus represent relatively simple baffles of the invention, wherein treatment of a range of sonic frequencies is effected in part by the range of aperture sizes in a plate, rather than depending on additional plates each of which has a more uniform aperture size.

FIGS. 3A and 4A also illustrate the principle, also seen in FIGS. 6A, 7A, and 8A wherein the apertures in the downstream plates such as plates 34B define an overall greater combined aperture open area than the apertures in the more upstream plates. Thus, it is highly desirable that plate aperture area increase, plate-to-plate, in order, along the direction of advance of gases through exhaust pipes 12 in the exhaust system.

While the applicant cannot explain any theory behind why certain aperture combinations work better than others, and while choosing to not be bound by theory, the inventors contemplate that the larger aperture areas toward the downstream side of the baffle provide gradual relief of the back pressure as the gas traverses the exhaust system, thereby encouraging continued flow of the exhaust gases as the amount of the obstructions decreases.

In all the baffles of the invention, the angles developed between the baffle plates and between the plates and the inner surface of the respective exhaust pipe, are generally consistent at all loci on the respective baffle plates. Baffles of the invention are preferably sized and configured such that such baffle can be inserted into a respective exhaust pipe with significant difficulty, namely a forced fit. Stops can be employed on either the baffle or in the pipe, or both, to ensure that the baffle is held longitudinally in the desired location.

The measurement of the included fixed angle between baffle plates can be determined by defining at least two areas on each of the adjacent plates. First, an apex is formed at the perimeter walls of two plates when those two plates are joined at a portion of their respective perimeters. Second, the distal end of each such plate is located. Imaginary straight lines are drawn between the apex and the distal ends, and an included angle is thus defined between the two imaginary lines, thereby defining the included angle corresponding to the angles illustrated in edge view in the respective drawings. By using this system of defining an apex, distal ends, and drawing imaginary lines therebetween, the included angles can be reliably and reproducibly defined even if the plates are comprised of surfaces which are not flat.

In certain of the preferred embodiments, baffle 22 can comprise three baffle plates. Such baffle having three plates comprises first and second fixed included angles. A second such included fixed angle is illustrated in e.g. the 4-plate embodiments of FIGS. 5B, 6B, 7B, 8B. As with baffles having two plates, each plate in three-plate baffles can possess an array of apertures which is comprised of a common aperture outline, or a variety of aperture outlines on one or more of the plates or wherein the apertures are internally consistent within each plate but are different for each of the plates.

In embodiments where a baffle comprises more than four baffle plates, the same technique used to define included fixed angles in the illustrated embodiments can be employed between respective adjacent plates to determine identify the angles 66.

Because the individual baffle plates can be angled or tilted from perpendicular angles with respect to axis 48 of the exhaust pipe, the open projected aperture area can be accordingly adjusted as desired in order to provide a desired open area which both facilitates flow of exhaust gases and contributes materially to attenuating engine noise. When a baffle plate is oriented perpendicular to the longitudinal direction of flow of the exhaust gases, the option for providing open areas is more limited.

As exhaust gases leave an engine, the gases are accompanied by sonic frequencies. The journey of such gases and sonic frequencies begins as the gases are discharged from the engine into header pipe 14. Thereafter, the exhaust gases and sonic frequencies encounter sound attenuation baffle 22. Upon reaching the baffle, the exhaust gases and sonic frequencies flow into, and through, the array of apertures contained in exhaust input plate 34A.

The first array of apertures on the plate 34A is configured such that exhaust gases flow efficiently through the array while sonic frequencies are significantly disrupted, refracted, reflected and/or diffused, and while a certain portion of the gas is deflected toward the inner surface of the respective exhaust pipe. This effect occurs because the sonic frequencies, noises or sounds, travel in waves, although the waves typically represent a wide range of frequencies. As the waves progress through the apertures, the waves are refracted, diffracted, mixed, dispersed, and otherwise disrupted. Such wave patterns can be disrupted at the baffle to the extent that portions of the waves cancel each other out, thus reducing or canceling the corresponding portions of the noise or other sound.

As the exhaust gases and sonic frequencies pass beyond the input plate and encounter the dispersal plate, once again, a portion of the exhaust gases efficiently pass through the array while a second portion is deflected toward inner surface 30 of the respective exhaust pipe. Such passage, dispersal, and other disruption of the exhaust gas flow, while accommodating continued advance of the gases toward posterior end 28 continues to dissipate the sonic energy extant in such exhaust gases.

As the exhaust gases and sonic frequencies encounter further plates in the baffle, again the gases are allowed to pass efficiently through the plates while the sonic energy is further disrupted.

To improve the ability of a given baffle to disrupt sonic frequencies, and thus muffle the sound of the engine, or to dissipate certain frequencies to a greater extent than other frequencies, thus to obtain a desired range of frequencies at the posterior end of the exhaust system, one can adjust the included angles between plates, can change various configurations, patterns, outlines, and sizes of the apertures, and can adjust any or all of the included angles. In working toward optimizing the muffling effect of the baffle, the baffle can be "tuned" to reduce the number and/or intensity of certain or all sonic frequencies, sounds and noises emitted from exhaust tip 20.

It has been surprisingly found that baffle 22 can accomplish desired levels of sound attenuation without engendering unacceptable levels of back-pressure in the exhaust system. Back-pressure is that pressure which builds up inside the exhaust system when the exhaust gases encounter some obstacle. Typically, back pressure is experienced when a sound attenuation device is placed in the exhaust stream Indeed, all sound attenuation devices develop some back pressure. The objective is to limit the back pressure, so as to maximize the energy, power outputted from the engine to do useful work.

When the exhaust gases become hindered by the exhaust system to an undesirable extent, the pressure of the gas in that portion of the system rises, and is fed back to the engine, whereby the engine must expend additional work to expel the exhaust gases through the exhaust system. Thus, as back pressure increases in an exhaust system, the usable engine horsepower is correspondingly decreased.

By using a baffle as illustrated herein, the back pressure is controlled to a desired level. Such limiting of back pressure is accomplished as a result of the desirable fractions of the plates which are represented by apertures 42.

Referring to e.g. FIGS. 6A, 8A, and 7A, in that order, the respective plates 34D all have apertures of the same or similar size, shape, and total plate area, the difference being the total aperture area. The smallest aperture area e.g. in FIG. 6A corresponds well with a baffle which operates well in a 4-inch nominal size exhaust pipe with a 5.7 liter engine. The intermediate aperture area of plate 34D of FIG. 8A operates well, in a 4-inch nominal diameter exhaust pipe, with a 400 horsepower engine. The larger area of plate 34D of FIG. 7A is designed for engines of greater than 400 horsepower. The progression of design of the FIGS. from 6A to 8A to 7A illustrates progressive design changes, namely increasing aperture area, not only in plate 34A, but also in each plate, which can be made to match a given baffle to a given engine.

In preferred embodiments, baffle 22 includes backwash check valve 45. The backwash check valve is made with a piece of e.g. resiliently deflectable material, such as sheet rubber, which is mounted on the exhaust discharging surface side of a baffle plate. The backwash valve can comprise any piece of material which is configured to cover the array of apertures. Typically, the backwash valve is made of flexible material or is mounted, such as by pins, rivets, bolts, and the like, and in such a manner, as to allow the valve to pivot, rotate or otherwise open. In a preferred embodiment, a spring is mounted and biased over the valve, with the valve between the spring and the respective plate, so as to bias the valve toward a closed position, thus to attenuate movement of water into the exhaust system and thence into the exhaust ports of the engine e.g. when a boat is rapidly decelerating.

In preferred embodiments the flat backwash valve is made of flexible rubber and mounted to the exhaust discharging surface of tip plate 34D or equivalent trailing plate in a baffle having more or less than 4 plates.

As exhaust gases pass through such baffle plate, the pressure with which the gases are advancing through exhaust system 10 pushes against the valve, thus to open the valve. The degree of opening of the valve depends on the quantity of exhaust gases and the pressure with which such exhaust gases are advancing through the exhaust system. An e.g. full open position for a rubber backwash valve 45 is representatively and generally illustrated in dashed outline in FIG. 1. Continuing flow of exhaust gases through the respective plate holds the valve open so long as such gases are continuing to flow from the engine. The degree of opening at any given time is a function of the volume and pressures of the gases traversing the exhaust system.

When the exhaust gas, and resulting pressure on the backwash valve therefrom, is reduced or eliminated, the backwash valve returns to its preferred closed position and lies snugly against the exhaust discharging surface. If needed, such spring as noted earlier, or other restorative force or device, can be employed in combination with the backwash valve sheet material to assure that the backwash valve returns to its closed position on the discharging surface of the baffle plate when exhaust gases are flowing at relatively low rates. Thus, when exhaust gases are not being vigorously pushed through the exhaust system and baffle, the backwash valve is open only enough to discharge the small quantity of gases being produced, and otherwise covers the apertures on tip plate 34D and prevents water and other contaminants from entering the exhaust system. While the backwash valve can be mounted to any of the baffle plates, the valve is most useful at the terminal/tip plate.

In addition, a back-up backwash valve can be mounted to any of the baffle plates which are located upstream of the illustrated valve on tip plate 34D. Thus, such backwash valve can be beneficially mounted to e.g. the discharging surface of plate 34C of FIG. 5B. Such discharge plate is oriented perpendicular to the direction of flow of gases through the gas flow channel, whereby the perpendicular orientation is highly effective to provide direct resistance to back flow of water through plate 34C.

Referring again to outer sound attenuation chamber 50, the sound attenuation packing material is normally fitted into the exhaust pipe prior to insertion of baffle 22.

After the sound attenuation layer is disposed inside the exhaust pipe, and after a suitable perforated tube 60 is installed, the baffle is inserted.

Because exhaust gases are expelled at high temperatures, heat fatigue and/or heat failure of exhaust system elements and materials can be materially accelerated by the transferred heat. To avoid or retard development of such heat-related failures, a water jacket can be employed in such exhaust system.

In exemplary embodiments, both water jacketing and a outer sound attenuation chamber 50 are used in combination, so as to gain the advantage of the cooperative effects of cooling the gases while dissipating sonic energy contained therein. In such embodiment, both thermal energy and sonic energy are extracted from the exhaust gases in outer chamber 50. A detailed description of preferred water jackets, and methods for making and using same, are found in U.S. Patent Application of Thomas William Beson, et. al., Ser. No. 09/652,195, filed Aug. 31, 2000 which is herein incorporated by reference in its entirety.

Although the exhaust system and baffle as described is preferably designed for engines which produce 350 to 2500 horsepower, the system can be configured for a multitude of engines, both engines of less power and engines of more power. Also, although the exhaust system and baffle described herein are generally designed for use with boats and motorcycles, the space advantages of exhaust systems of the invention can be beneficially utilized any place where space is at a premium. Indeed, the invention can be employed on any vehicle which employs an internal combustion engine.

Figure 9:
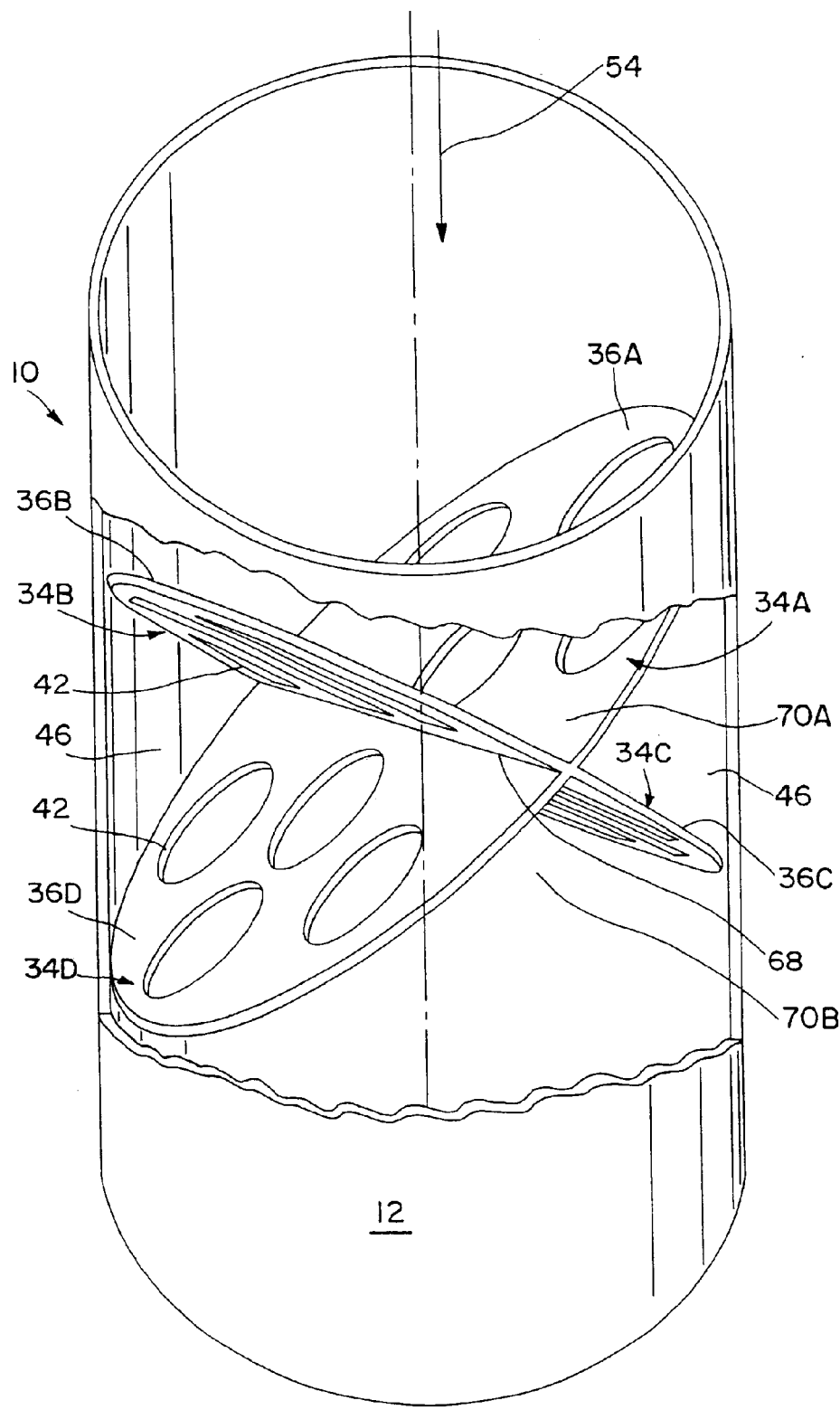
FIG. 9 shows a partial and cut-away pictorial view of an exhaust system wherein the baffle comprises intersecting baffle plates wherein the line of intersection passes substantially close to the longitudinal axis of the exhaust pipe.

FIG. 9 illustrates a family of embodiments wherein baffle 22 comprises first and second baffle plates 34A, 34B which are joined to each other at a line of intersection 68 which extends across the respective plates 34A, 34B at loci which represent substantial widths of the respective plates. The purpose of the line of intersection is to divide each of the respective plates into multiple, e.g. 2, sections, and wherein each section functions somewhat like an individual plate. Accordingly, the line of intersection tends toward providing the effect of more plates than actually exist in the baffle. Accordingly, the portions of baffle plates 34A and 34B which are generally downstream of line of intersection 45 are labeled as 34C and 34D.

Line of intersection 45 can be placed at a wide variety of locations, and can have a wide variety of orientations. In general, the line of intersection, in combination with plates 34A, 34B, should provide some level of obstruction to free flow of exhaust gases through the exhaust pipe, so as to ensure that the gas stream is forced to pass through apertures 42 as the gas traverses the gas flow channel. In the illustrated embodiment, the line of intersection extends generally across the full width of the gas flow channel, whereby the baffle plates define first and second generally closed sound attenuation chambers 46, an entrance receptacle 70A open upstream of the baffle plates, and a discharge receptacle 70B open downstream of the baffle plates.

As exhaust gases approach the baffle of FIG. 9, the gases first encounter the exhaust receiving surfaces 36A, 36B on the upstream sides of plates 34A, 34B. The gases then pass through apertures 42 which are associated with surfaces 36A, 36B and move into closed sound attenuation chambers 46 where additional back pressure is exerted by plate surfaces associated with exhaust receiving surfaces 36C and 36D of plates 34C and 34D. As with the earlier discussed embodiments, the enclosed sound attenuation chambers cause mixing, fracture, deflection, and other disruptions of free flow of the gases, thereby absorbing kinetic energy, thermal energy, and sonic energy from the gases, and thereby attenuating undesired sonic and thermal parameters of the exhaust gases.

The exhaust gases leave closed chambers 46 through apertures 42 in plates 34C and 34D and thus exit the baffle at exhaust discharging surfaces 38C and 38D which form discharge receptacle 70B defined by plates 34C and 34D.

The baffle of FIG. 9 can have more than one line of intersection extending across the width of the gas flow channel where respective baffle plates cross, so long as surfaces of the respective plates are suitably spaced, and apertures are suitably spaced and arranged, to define chambers effective in attenuating sonic energy. In general, the lines of intersection extend across the width of the gas flow channel, and the baffle plates are oriented at oblique angles to the direction of flow of the exhaust gases, thus to cause deflection of the exhaust gases toward the inner surface of the respective exhaust pipe and to enable suitable aperture area to be developed in plates 34. In preferred embodiments, the combined aperture area of plates 34C and 34D is greater than the combined aperture area of plates 34A and 34B.

FIGS. 10A, 10B, 10C, and 10D illustrate an exception to the general principle that the baffle plates should not be parallel to each other. As seen in FIGS. 10A–10D, elliptical plates 34A, 34B and 34D are parallel to each other, and are spaced from each other by spacing brackets 72. As seen therein, spacing brackets 72 are mounted to the baffle plates at perimeter walls 40 adjacent the minor axes of the respective plates and extend in straight lines between the plates on opposing sides of the respective plates.

Figure 10B:
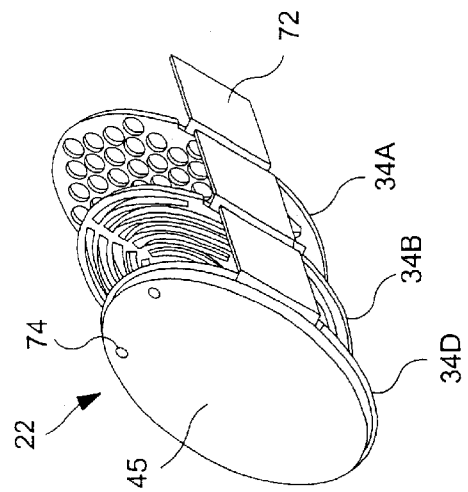
FIGS. 10A–10D show respective pictorial, top, side edge, and end, views of a 3-plate parallel baffle which is designed and configured to be oriented at a non-perpendicular angle to the longitudinal axis in the exhaust pipe, while providing general edge seals between perimeter walls of the plates and the inner surface of the exhaust pipe.
Figure 10D:
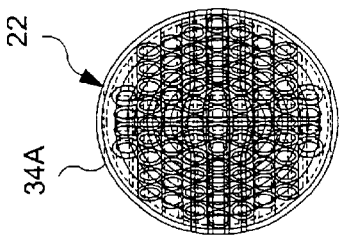
Figure 10A:
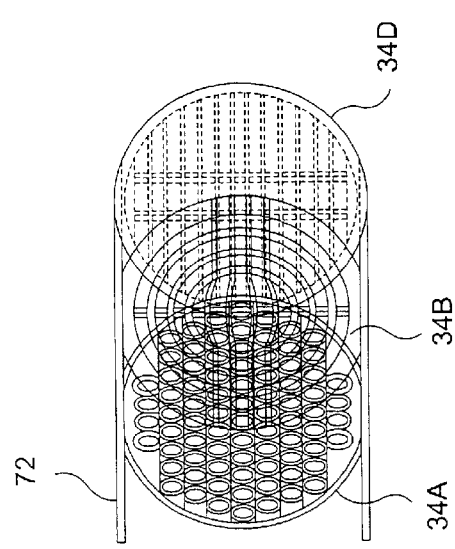

FIG. 10A shows a pictorial view of such baffle, including a pictorial view of a backwash valve 45 mounted to plate 34D by rivets 74. FIG. 10B shows a top view without the backwash valve, and shows that each of the three baffle plates has an internally consistent aperture structure and wherein each plate has a different aperture structure. Thus, the apertures of plate 34A are all circles, all the same size, and all uniformly spaced from each other. The apertures of plate 34B are all arcuate slots extending in an expanding array from a center of the plate, and all uniformly spaced from each other. The apertures of plate 34D are all straight-line slots, all parallel to each other, and all uniformly spaced from each other.

Figure 10C:
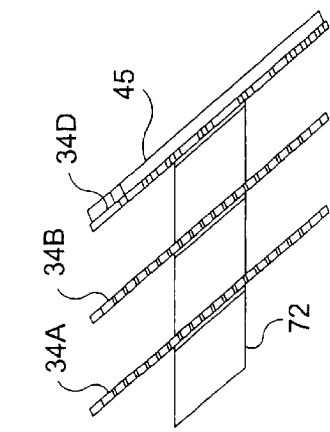

FIG. 10C shows the parallel relationships among the three plates. FIG. 10D is a front elevation of the baffle looking through the end of the baffle associated with plate 34A. FIG. 10C illustrates that a well-designed and well-constructed baffle provides limited, if any, straight line of sight paths through the collective end-to-end view of the plates of the baffle, whereby the gas flow is substantially broken up as the gas traverses the baffle, while not being severely impeded from traverse of the baffle.

With the exception of the embodiments of FIGS. 9 and 10A–10D, a baffle of the invention can be made from a unitary piece of e.g. sheet stainless steel. Such sheet steel is first punched in e.g. a punch press to create apertures 42, and is then blanked, also in a punch press to develop the perimeter walls and thus the individual work piece. The work piece at that stage of creation is typically planar as illustrated in FIGS. 5A, 6A, 7A, and 8A. The baffle is subsequently formed, again typically in a press and die arrangement, to develop the angles between the respective plates.

As to FIG. 9 embodiments, the plates are slotted to mutually receive each other at the line of intersection. When the plates are joined to each other, a weld is preferably formed at the line of intersection to hold the plates in desired joinder and orientation with respect to each other.

Regarding FIGS. 10A–10D, the baffle plates are punched and blanked, and are then assembled to brackets 72 by any known joinder method such as welding, rivets, bolts or the like. Welding is preferred.

The embodiments illustrated herein show examples of baffles containing two baffle plates, three baffle plates, and five baffle plates. The baffles of the invention can comprise as few as one plate, and as many as about six plates. Typically, exhaust systems of the invention do not use baffles having more than about eight plates because greater than about eight plates creates undesired levels of back pressure without beneficial levels of compensating sound attenuation.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

To the extent the following claims use means plus function language, it is not meant to include there, or in the instant specification, anything not structurally equivalent to what is shown in the embodiments disclosed in the specification.

Having thus described the invention, what is claimed is:

1. An in-line sound attenuating exhaust system for use in combination with an internal combustion engine, said sound attenuating exhaust system comprising:
  (a) an exhaust pipe having first and second ends, and a length between the first and second ends, an inner surface, a gas flow channel defined at and inwardly of the inner surface, and a longitudinal axis;
  (b) a sound-attenuating baffle comprising at least two and up to about six baffle plates, connected to each other, including a leading baffle plate first encountered by exhaust gas received from such internal combustion engine, and a trailing baffle plate last encountered by exhaust gas received from such internal combustion engine, said baffle plates extending transversely across the gas flow channel transverse to the longitudinal axis, each said baffle plate having a perimeter wall, an exhaust receiving surface, an exhaust discharging surface, and an array of apertures extending between the exhaust receiving surface and the exhaust discharging surface; and
  (c) first and second ones of said baffle plates defining, in edge view, respective plate angles with respect to the longitudinal axis, the magnitude of the first plate angle with respect to the longitudinal axis being different from the magnitude of the second plate angle with respect to the longitudinal axis.

2. An in-line sound attenuating exhaust system as in claim 1 wherein the magnitudes of the first and second plate angles with respect to the longitudinal axis cooperate with each other in attenuating different sonic frequencies of exhaust gases passing through s aid baffle.

3. An in-line sound attenuating exhaust system for use in combination with an internal combustion engine, said sound attenuating exhaust system comprising:
  (a) an exhaust pipe having first and second ends, and a length between the first and second ends, a gas flow channel having a constant diameter between the first and second ends, and a first longitudinal axis; and
  (b) a sound-attenuating baffle disposed in said exhaust pipe, said sound-attenuating baffle comprising
    (i) a first baffle plate having a first exhaust receiving surface, a first exhaust discharging surface, a first perimeter wall, and a first array of apertures extending between the first exhaust receiving surface and the first exhaust discharging surface, and
    (ii) a second baffle plate, joined to said first baffle plate in a generally edge-to-edge orientation with an included angle therebetween of greater than 5 degrees, and disposed downstream, with respect to flow of exhaust gases through said exhaust pipe, of said first baffle plate, said second baffle plate having a second exhaust receiving surface, a second exhaust discharging surface, a second perimeter wall, and a second array of apertures extending between the second exhaust receiving surface and the second exhaust discharging surface, said first and second perimeter walls defining a collective projected perimeter of said baffle along a projection of the first and second perimeter walls, thereby to define a second longitudinal axis of said sound-attenuating baffle, said sound attenuating baffle having a length, taken along the second longitudinal axis, of no more than about 36 inches, said exhaust system being effective to reduce sonic interisity of exhaust gases of a suitably sized internal combustion engine, passed therethrough, by at least 3 decibels.

4. An in-line exhaust system as in claim 3 wherein said baffle plates are substantially planar.

5. An in-line exhaust system as in claim 3, said exhaust pipe comprising an imperforate outer wall, a perforate inner wall, and an outer sound attenuation chamber between said outer and inner walls, said baffle plates having sufficient sound-deflection surface area, and being disposed at such angles with respect to gas flow through said baffle, as to deflect substantial portions of a gas, traversing said exhaust pipe, toward the outer chamber, so as to both enhance mixing of gases traversing said exhaust pipe and cause movement of such gases through said inner wall of said exhaust pipe into said outer sound-attenuation chamber.

6. An in-line sound-attenuating exhaust system as in claim 3, said baffle being held in said exhaust pipe by friction engagement between said baffle and said exhaust pipe.

7. A baffle for use in a sound-attenuating exhaust system, said sound-attenuating baffle comprising from two to about six baffle plates having respective exhaust receiving surfaces, respective exhaust discharging surfaces, respective perimeter walls, and respective arrays of apertures extending between the respective exhaust receiving surfaces and the respective exhaust discharging surfaces, said perimeter walls defining a collective projected perimeter of said baffle along a collective projection of the perimeter walls, thereby to define a longitudinal axis of said sound-attenuating baffle, each said baffle plate defining, in edge view, a plate angle with the longitudinal axis, at least one such plate angle being different in magnitude from another such plate angle.

8. A baffle as in claim 7, said baffle further comprising a backwash valve secured over one of said baffle plates and joined to the respective said baffle plate at an edge of said backwash valve.

9. A baffle as in claim 7 wherein the magnitudes of the respective plate angles cooperate with each other in attenuating first and second different sets of sonic frequencies of exhaust gases passing through said baffle.

10. A baffle as in claim 7 wherein at least one of a first array of apertures on a first said plate, a second array of apertures different from the first array, on a second said plate, and a third array of apertures different from the first and second arrays, on a third said plate comprise respective ones of the apertures defining different aperture areas.

11. A baffle as in claim 7 wherein a first aperture configuration on a first said plate, a second aperture configuration on a second said plate, and a third aperture configuration on a third said plate define at least two different aperture configurations, and complement each other in attenuating first, second, and third different sets of sonic frequencies of exhaust gases passing through said baffle along the longitudinal axis.

12. A baffle as in claim 7 wherein a first aperture configuration on a first said plate, a second aperture configuration on a second said plate, and a third aperture configuration on a third said plate define at least two different aperture configurations, and complement each other in controlling back pressure exerted by exhaust gases passing through said baffle along the longitudinal axis.

13. A baffle as in claim 7 wherein at least one of first, second, and third aperture configurations, in respective first, second, and third ones of said plates, is distinct from at least another of the first, second, and third aperture configurations.

14. A baffle as in claim 7 wherein at least one of said aperture configurations comprises at least one of plural aperture sizes and plural aperture designs.

15. A baffle as in claim 7 wherein said baffle plates are substantially planar.

16. An in-line sound attenuating exhaust system for use in combination with an internal combustion engine, said sound attenuating exhaust system comprising:

(a) an exhaust pipe having first and second ends, and a length between the first and second ends, an inner surface, a gas flow channel disposed at and inwardly of the inner surface, and a first longitudinal axis, the first and second ends having respective first and second cross-sectional areas thereacross, and respective first and second sizes of the first and second cross-sectional areas; and (b) a sound-attenuating baffle disposed in said exhaust pipe, said sound-attenuating baffle comprising
  (i) a first baffle plate having a first exhaust receiving surface, a first exhaust discharging surface, a first perimeter wall, and a first array of apertures in a first aperture configuration extending between the first exhaust receiving surface and the first exhaust discharging surface, and
  (ii) a second baffle plate, joined to said first baffle plate, said second baffle plate having a second exhaust receiving surface, a second exhaust discharging surface, a second perimeter wall, and a second array of apertures in a second aperture configuration extending between the second exhaust receiving surface and the second exhaust discharging surface, and wherein said first and second baffle plates define respective first and second different plate angles with the second longitudinal axis.

17. A sound attenuating exhaust system as in claim 16 wherein the magnitudes of the first and second plate angles cooperate with each other in attenuating different sets of sonic frequencies of exhaust gases passing through said baffle.

18. An in-line sound attenuating exhaust system for use in combination with an internal combustion engine, said sound attenuating exhaust system comprising:

(a) an exhaust pipe having first and second ends, and a length between the first and second ends, a gas flow channel having a constant diameter between the first and second ends, and a first longitudinal axis; and (b) a sound-attenuating baffle disposed in said exhaust pipe, said sound-attenuating baffle comprising from two to six baffle plates having respective exhaust receiving surfaces, respective exhaust discharging surfaces, respective perimeter walls, and respective arrays of apertures extending between the respective exhaust receiving surfaces and the respective exhaust discharging surfaces, said perimeter walls defining a combined projected perimeter of said baffle along a collective projection of the perimeter walls, thereby to define a second longitudinal axis of said sound-attenuating baffle, said arrays of apertures having respective projected aperture areas, projected perpendicular to the respective baffle plates, first and second said baffle plates being joined to each other, each said baffle plate defining, in edge view, a plate angle with the second longitudinal axis, the magnitude of at least one such plate angle being different from another such plate angle.

19. An in-line exhaust system as in claim 18 wherein said baffle plates are substantially planar.

20. An in-line sound attenuating exhaust system for use in combination with an internal combustion engine, said in-line sound attenuating exhaust system comprising:
(a) an exhaust pipe having first and second ends, and a length between the first and second ends, an inner surface, an outer surface, a gas flow channel, and a first longitudinal axis; and
(b) a sound-attenuating baffle disposed in said exhaust pipe, said sound-attenuating baffle comprising a plurality of baffle plates, joined to each other in sequence, in generally edge-to-edge orientations with each other, with respective included angles between respective ones of said baffle plates, thereby to form a generally elongate chain of up to about six baffle plates, each secured to at least one adjacent baffle plate with a said included angle therebetween, each said baffle plate having an exhaust receiving surface, an exhaust discharging surface, and an array of apertures extending between the exhaust receiving surface and the exhaust discharging surface,
and wherein a first said baffle plate defines a perpendicular angle with the second longitudinal axis, wherein a second baffle plate defines a 45 degree angle with the second longitudinal axis, wherein a third baffle plate defines a perpendicular angle with the second longitudinal axis, and wherein a fourth baffle plate defines a 35 degree angle with the second longitudinal axis.

21. An in-line sound attenuating exhaust system for use in combination with an internal combustion engine, said in-line sound attenuating exhaust system comprising:
(a) an exhaust pipe having first and second ends, and a length between the first and second ends, an inner surface, an outer surface, a gas flow channel, and a first longitudinal axis; and
(b) a sound-attenuating baffle disposed in said exhaust pipe, said sound-attenuating baffle comprising a plurality of baffle plates, joined to each other in sequence, in generally edge-to-edge orientations with each other, with respective included angles between respective ones of said baffle plates, thereby to form a generally elongate chain of up to about six baffle plates, each secured to at least one adjacent baffle plate with a said included angle therebetween, each said baffle plate having an exhaust receiving surface, an exhaust discharging surface, and an array of apertures extending between the exhaust receiving surface and the exhaust discharging surface,
and wherein a first said baffle plate defines a 75 degree angle with the second longitudinal axis, wherein a second baffle plate in sequence defines a 65 degree angle with the second longitudinal axis, wherein a third baffle plate in sequence defines a perpendicular angle with the second longitudinal axis, and wherein a fourth baffle plate in sequence defines a 35 degree angle with the second longitudinal axis.

22. An in-line sound attenuating exhaust system for use in combination with an internal combustion engine, said sound attenuating exhaust system comprising:
(a) an exhaust pipe having anterior and posterior ends, and a length between the anterior and posterior ends, a gas flow channel, and a first longitudinal axis; and
(b) a sound-attenuating baffle disposed in said exhaust pipe, said sound-attenuating baffle comprising at least two baffle plates and up to about 6 baffle plates, including
(i) a first baffle plate having a first exhaust receiving surface, a first exhaust discharging surface, a first perimeter wall, and a first array of apertures extending between the first exhaust receiving surface and the first exhaust discharging surface, and
(ii) a second baffle plate, joined to said first baffle plate in a generally edge-to-edge orientation by a bridge between said first and second baffle plates, spacing said first and second baffle plates from each other, said second baffle plate having a second exhaust receiving surface, a second exhaust discharging surface, a second perimeter wall, and a second array of apertures extending between the second exhaust receiving surface and the second exhaust discharging surface.

23. An in-line sound-attenuating exhaust system as in claim 22, a leading edge of said baffle being disposed, in said exhaust pipe, upstream of said bridge and between said bridge and the anterior end of said exhaust pipe, said baffle being held in said exhaust pipe by friction engagement between said exhaust pipe and said baffle, said baffle being made from material having sufficient bending resilience, and the friction engagement adjacent the leading edge being cooperatively configured, such that force exerted on the exhaust receiving surface of the first plate increases the intensity of the friction defined by the friction engagement between said exhaust pipe and said baffle plate.

24. An exhaust system as in claim 23, the friction engagement in the vicinity of the anterior end of the exhaust pipe being cooperatively configured such that force exerted on the exhaust receiving surface of the first plate increases the intensity of the friction defined by the friction engagement between said exhaust pipe and said baffle plate.

25. An exhaust system as in claim 24, the friction engagement in the vicinity of the anterior end of the exhaust pipe being cooperatively configured such that force exerted on the exhaust receiving surface of the first plate increases the intensity of the friction defined by the friction engagement between said exhaust pipe and said baffle plate at said perimeter wall in the vicinity of the anterior end.

26. An exhaust system as in claim 23 wherein said perimeter walls are free from apertures thereby to enhance bending resistance and corresponding friction engagement strength at said perimeter walls.

27. An exhaust system as in claim 22 wherein said baffle plates are substantially planar.

28. An in-line sound attenuating exhaust system for use in combination with an internal combustion engine, said sound attenuating exhaust system comprising:
(a) an exhaust pipe having an inner surface, an outer surface, a gas flow channel, and a longitudinal axis; and (b) a sound-attenuating baffle disposed in said exhaust pipe, said sound-attenuating baffle comprising
  (i) a first generally elliptical baffle plate having a first exhaust receiving surface, a first exhaust discharging surface, a first perimeter wall, and a first array of apertures extending between the first exhaust receiving surface and the first exhaust discharging surface, and
  (ii) a second generally elliptical baffle plate, joined to and crossing said first baffle plate at a single line of intersection extending across widths of said first and second baffle plates, said second baffle plate having a second exhaust receiving surface, a second exhaust discharging surface, a second perimeter wall, and a second array of apertures extending between the second exhaust receiving surface and the second exhaust discharging surface.

29. An in-line sound attenuating exhaust system as in claim 28, said first and second baffle plates being joined to each other in a crossing relationship at a generally straight line of intersection extending across said baffle plates.

30. An in-line sound attenuating exhaust system as in claim 29, the elliptical configurations of said first and second baffle plates being so designed in combination with said exhaust pipe and said line of intersection that said baffle is configured such that substantial portions of the perimeter walls engage the inner surface of said exhaust pipe, and such that said line of intersection extends at an angle across the longitudinal axis of said exhaust pipe, wherein said baffle plates extend across a cross-section of a gas flow channel in said exhaust pipe so as to define an entrance surface of said baffle defined in part by each of said first and second baffle plates and receiving initial baffle exposure to exhaust gases traversing said exhaust pipe, an exit surface of said baffle defined in part by each of said first and second baffle plates and receiving the last baffle exposure to exhaust gases traversing said exhaust pipe, and first and second enclosures on opposing sides of said line of intersection, each defined by portions of said first and second baffle plates in combination with a portion of the inner surface of said exhaust pipe, exhaust gases traversing said exhaust pipe passing through a first set of apertures in said baffle plates at the entrance surface thus to enter the enclosures, and passing through a second different set of apertures in said baffle plates toward the exit surface thus to exit the enclosures and accordingly to exit the baffle.

31. An exhaust system as in claim 30, said exhaust pipe comprising an imperforate outer wall, a perforate inner wall, and an outer sound attenuation chamber between said outer and inner walls, said baffle plates having sufficient sound-deflection surface area, and being disposed at such angles with respect to gas flow through said baffle, as to deflect substantial portions of a gas, traversing said exhaust pipe, toward the outer chamber, so as to both enhance mixing of gases traversing said exhaust pipe and cause movement of such gases through said inner wall of said exhaust pipe into said outer sound-attenuation chamber.

32. An in-line sound attenuating exhaust system as in claim 28, including a weld securing said first and second baffle plates to each other at the line of intersection.

33. An in-line sound attenuating exhaust system for use in combination-with an internal combustion engine, said sound attenuating exhaust system comprising:
  (a) an exhaust pipe having first and second ends, and a length between the first and second ends, an inner surface, an outer surface, a gas flow channel, and a first longitudinal axis; and
  (b) a sound-attenuating baffle disposed in said exhaust pipe, said sound-attenuating baffle comprising
    (i) a first baffle plate having a first exhaust receiving surface, a first exhaust discharging surface, a first perimeter wall, and a first array of apertures extending between the first exhaust receiving surface and the first exhaust discharging surface, and
    (ii) a second baffle plate having a second exhaust receiving surface, a second exhaust discharging surface, a second perimeter wall, and a second array of apertures extending between the second exhaust receiving surface and the second exhaust discharging surface,
  said first and second baffle plates being substantially planar, said first and second baffle plates extending transversely across substantially a full width of the gas flow channel at oblique angles, said first and second baffle plates being spaced from each other along the length of the exhaust pipe, and oriented parallel to each other with sufficient generally open space therebetween to define a useful sound attenuation chamber.

34. An exhaust system as in claim 33, said first and second baffle plates being joined together by brackets extending therebetween whereby said baffle is a unitary assembly.

35. An in-line exhaust system as in claim 33 wherein said baffle plates are substantially planar.

36. An exhaust system as in claim 33, said exhaust pipe comprising an imperforate outer wall, a perforate inner wall, and an outer sound attenuation chamber between said outer and inner walls, said baffle plates having sufficient sound-deflection surface area, and being disposed at such angles with respect to gas flow through said baffle, as to deflect substantial portions of a gas, traversing said exhaust pipe, toward the outer chamber, so as to both enhance mixing of gases traversing said exhaust pipe and cause movement of such gases through said inner wall of said exhaust pipe into said outer sound-attenuation chamber.

37. An exhaust system as in claim 33, including a third baffle plate extending transversely across the width of the gas flow channel at an oblique angle, spaced from and parallel to the first and second baffle plates.

* * * * *